(12) United States Patent
Nhep et al.

(10) Patent No.: US 8,494,329 B2
(45) Date of Patent: Jul. 23, 2013

(54) FIBER OPTIC MODULE AND CHASSIS

(75) Inventors: Ponharith Nhep, Savage, MN (US); Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 230 days.

(21) Appl. No.: 12/688,688

(22) Filed: Jan. 15, 2010

(65) Prior Publication Data

US 2011/0019964 A1 Jan. 27, 2011

Related U.S. Application Data

(60) Provisional application No. 61/145,020, filed on Jan. 15, 2009.

(51) Int. Cl.
*G02B 6/00* (2006.01)

(52) U.S. Cl.
USPC .......................................................... 385/135

(58) Field of Classification Search
USPC .......................................................... 385/135
See application file for complete search history.

(56) References Cited

U.S. PATENT DOCUMENTS

| | | | |
|---|---|---|---|
| 4,435,612 A | 3/1984 | Smith | |
| 4,824,196 A * | 4/1989 | Bylander | 385/134 |
| 4,850,901 A | 7/1989 | Smith et al. | |
| 5,189,410 A | 2/1993 | Kosugi et al. | |
| 5,285,515 A | 2/1994 | Milanowski et al. | |

(Continued)

FOREIGN PATENT DOCUMENTS

| | | |
|---|---|---|
| DE | 202 01 170 U1 | 5/2002 |
| EP | 0 730 177 A2 | 9/1996 |

(Continued)

OTHER PUBLICATIONS

ADC Telecommunications, Inc., DSX-3 Digital Signal Cross-Connect, Doc. No. 274, dated Oct. 2004, 65 pp.

(Continued)

*Primary Examiner* — Charlie Peng
(74) *Attorney, Agent, or Firm* — Merchant & Gould P.C.

(57) ABSTRACT

A telecommunications assembly includes a chassis with a top wall, a bottom wall, a front opening, a rear opening, and first and second transverse sidewalls extending between the front and rear openings, the top wall and bottom walls defining slots. Upper mounting guides defining upper key slots between adjacent upper guides and lower mounting guides defining lower key slots between adjacent lower guides are mounted to the top and bottom walls. The upper and lower guides define snap-fit structures inserted into the slots defined on the top and bottom walls for mounting the upper and lower guides to the chassis. At least one of the upper and the lower mounting guides defines adapter mounts for slidably receiving fiber optic adapters through the rear opening. Fiber optic modules are slidably received within the chassis through the front opening and each module is slidably inserted into the upper and lower key slots of the chassis, each module removable from the chassis through the front opening. A fiber optic adapter that is separate from the module may be slidably received within the chassis through the rear opening into one of the adapter mounts, the fiber optic adapter removable through the rear opening. The module may include at least one connector that protrudes from the module that is adapted to be inserted into the adapter when the module is inserted into the chassis.

8 Claims, 23 Drawing Sheets

U.S. PATENT DOCUMENTS

| | | | |
|---|---|---|---|
| 5,317,663 A | 5/1994 | Beard et al. | |
| 5,339,379 A | 8/1994 | Kutsch et al. | |
| 5,363,465 A | 11/1994 | Korkowski et al. | |
| 5,432,875 A | 7/1995 | Korkowski et al. | |
| 5,497,444 A | 3/1996 | Wheeler | |
| 5,627,925 A | 5/1997 | Alferness et al. | |
| 5,647,045 A * | 7/1997 | Robinson et al. | 385/135 |
| 5,694,511 A | 12/1997 | Pimpinella et al. | |
| 5,701,380 A | 12/1997 | Larson et al. | |
| 5,717,810 A | 2/1998 | Wheeler | |
| 5,946,440 A | 8/1999 | Puetz | |
| 6,208,796 B1 | 3/2001 | Vigliaturo | |
| 6,226,111 B1 | 5/2001 | Chang et al. | |
| 6,226,434 B1 * | 5/2001 | Koshiyama et al. | 385/134 |
| 6,263,136 B1 | 7/2001 | Jennings et al. | |
| 6,307,998 B2 | 10/2001 | Vigliaturo | |
| 6,363,183 B1 | 3/2002 | Koh | |
| 6,370,294 B1 | 4/2002 | Pfeiffer et al. | |
| 6,385,381 B1 * | 5/2002 | Janus et al. | 385/135 |
| 6,418,262 B1 | 7/2002 | Puetz et al. | |
| 6,424,781 B1 | 7/2002 | Puetz et al. | |
| 6,424,783 B1 * | 7/2002 | Hara | 385/135 |
| 6,532,332 B2 | 3/2003 | Solheid et al. | |
| 6,535,682 B1 * | 3/2003 | Puetz et al. | 385/135 |
| 6,556,738 B2 | 4/2003 | Pfeiffer et al. | |
| 6,556,763 B1 | 4/2003 | Puetz et al. | |
| 6,591,051 B2 | 7/2003 | Solheid et al. | |
| 6,614,953 B2 | 9/2003 | Strasser et al. | |
| RE38,311 E | 11/2003 | Wheeler | |
| 6,647,197 B1 | 11/2003 | Marrs et al. | |
| 6,668,108 B1 | 12/2003 | Helkey et al. | |
| 6,760,531 B1 | 7/2004 | Solheid et al. | |
| 6,768,860 B2 * | 7/2004 | Liberty | 385/135 |
| 6,810,193 B1 | 10/2004 | Müller | |
| 6,822,874 B1 | 11/2004 | Marler | |
| 6,850,685 B2 | 2/2005 | Tinucci et al. | |
| 6,885,798 B2 | 4/2005 | Zimmel | |
| 7,142,764 B2 | 11/2006 | Allen et al. | |
| 7,190,874 B1 | 3/2007 | Barth et al. | |
| 7,194,181 B2 | 3/2007 | Holmberg et al. | |
| 7,418,181 B2 | 8/2008 | Zimmel et al. | |
| 7,542,649 B1 * | 6/2009 | Andersen | 385/135 |
| 7,764,858 B2 * | 7/2010 | Bayazit et al. | 385/135 |
| 7,889,961 B2 * | 2/2011 | Cote et al. | 385/135 |
| 8,009,954 B2 * | 8/2011 | Bran de Leon et al. | 385/135 |
| 2002/0041738 A1 | 4/2002 | Carberry et al. | |
| 2002/0181896 A1 | 12/2002 | McClellan et al. | |
| 2003/0132685 A1 | 7/2003 | Sucharczuk et al. | |
| 2003/0134541 A1 | 7/2003 | Johnsen et al. | |
| 2003/0147597 A1 | 8/2003 | Duran | |
| 2003/0202765 A1 | 10/2003 | Franklin et al. | |
| 2004/0062508 A1 * | 4/2004 | Blankenship et al. | 385/134 |
| 2004/0109660 A1 * | 6/2004 | Liberty | 385/135 |
| 2004/0240826 A1 | 12/2004 | Daoud et al. | |
| 2005/0053341 A1 | 3/2005 | Zimmel | |
| 2005/0067847 A1 | 3/2005 | Zellak | |
| 2005/0100301 A1 * | 5/2005 | Solheid et al. | 385/135 |
| 2005/0105879 A1 | 5/2005 | Kanasaki et al. | |
| 2005/0232550 A1 | 10/2005 | Nakajima et al. | |
| 2005/0232551 A1 | 10/2005 | Chang et al. | |
| 2005/0232565 A1 | 10/2005 | Heggestad et al. | |
| 2006/0083468 A1 | 4/2006 | Kahle et al. | |
| 2006/0093301 A1 | 5/2006 | Zimmel et al. | |
| 2007/0036503 A1 | 2/2007 | Solheid et al. | |
| 2007/0047893 A1 * | 3/2007 | Kramer et al. | 385/135 |
| 2007/0147765 A1 | 6/2007 | Gniadek et al. | |
| 2007/0189692 A1 | 8/2007 | Zimmel et al. | |
| 2009/0116806 A1 | 5/2009 | Zimmel et al. | |

FOREIGN PATENT DOCUMENTS

| | | |
|---|---|---|
| EP | 0 828 356 A2 | 3/1998 |
| EP | 1 473 578 A2 | 11/2004 |
| GB | 2 300 978 A | 11/1996 |
| WO | WO 96/36896 | 11/1996 |
| WO | WO 03/093889 A1 | 11/2003 |
| WO | WO 2006/127397 A1 | 11/2006 |

OTHER PUBLICATIONS

ADC Telecommunications, Inc., OmniReach FTTP Solutions, Doc. No. 1276550, dated May 2004, 12 pp.

Pending U.S. Appl. No. 11/138,063, filed May 25, 2005, entitled "Fiber Optic Splitter Module".

Pending U.S. Appl. No. 11/138,889, filed May 25, 2005, entitled "Fiber Optic Adapter Module".

Prosecution History of U.S. Appl. No. 10/980,978 (OA Dec. 15, 2005; Resp. Jun. 15, 2006; OA Sep. 6, 2006; Resp. Mar. 6, 2007; OA Jun. 1, 2007).

Prosecution History of U.S. Appl. No. 11/138,063 (OA Dec. 27, 2006; Resp. Apr. 27, 2007; OA Jul. 30, 2007).

Prosecution History of U.S. Appl. No. 11/138,889 (OA Dec. 14, 2005; Resp. Jun. 14, 2006; OA Sep. 11, 2006; Resp. Mar. 12, 2007; OA Jun. 13, 2007).

Prosecution History of U.S. Appl. No. 11/215,837 (OA Jul. 28, 2006; Resp. Oct. 30, 2006; OA Jan. 26, 2007; Resp. Apr. 26, 2007; Notice of Allowance Aug. 2, 2007).

International Search Report and Written Opinion mailed Jul. 6, 2010.

Invitation to Pay Additional Fees with Partial International Search mailed Apr. 28, 2010.

* cited by examiner

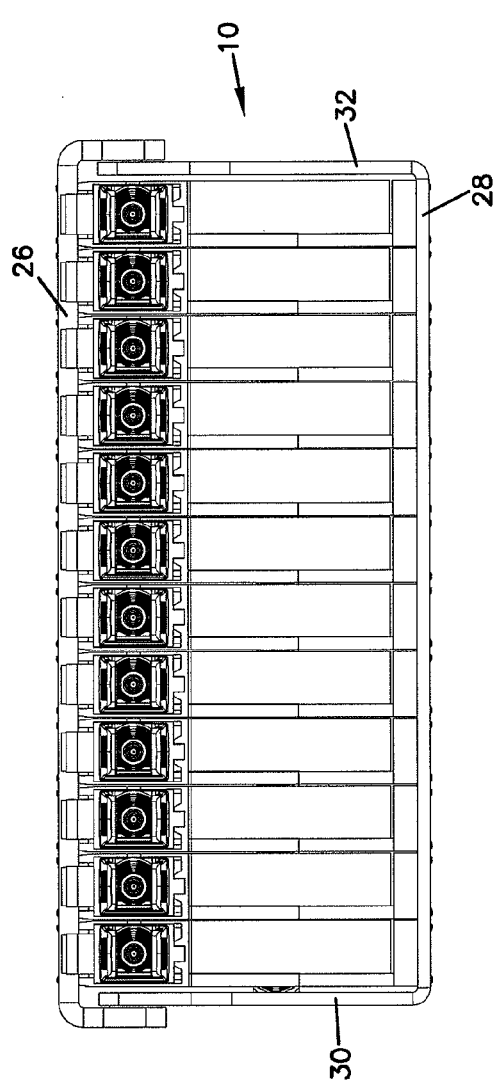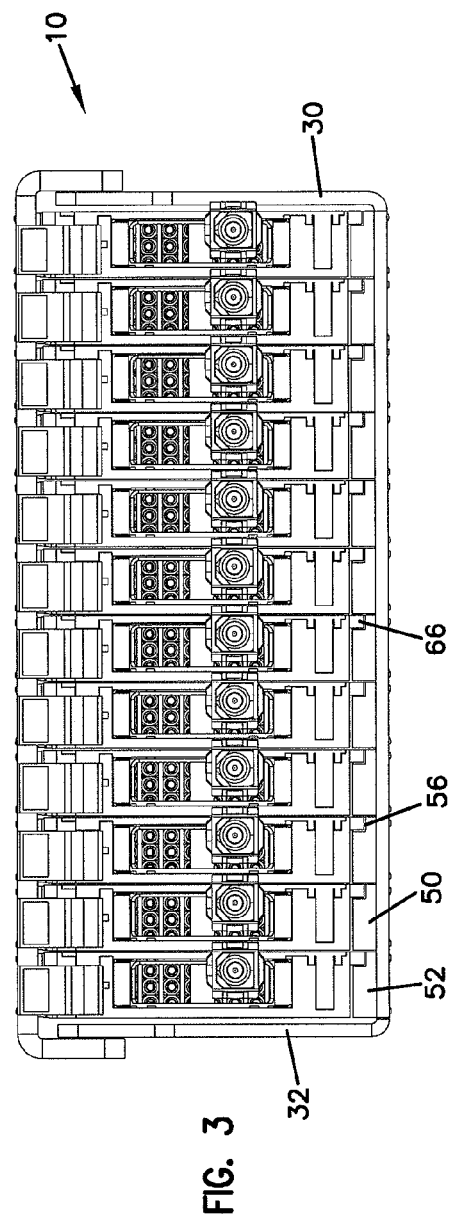
FIG. 4
FIG. 3

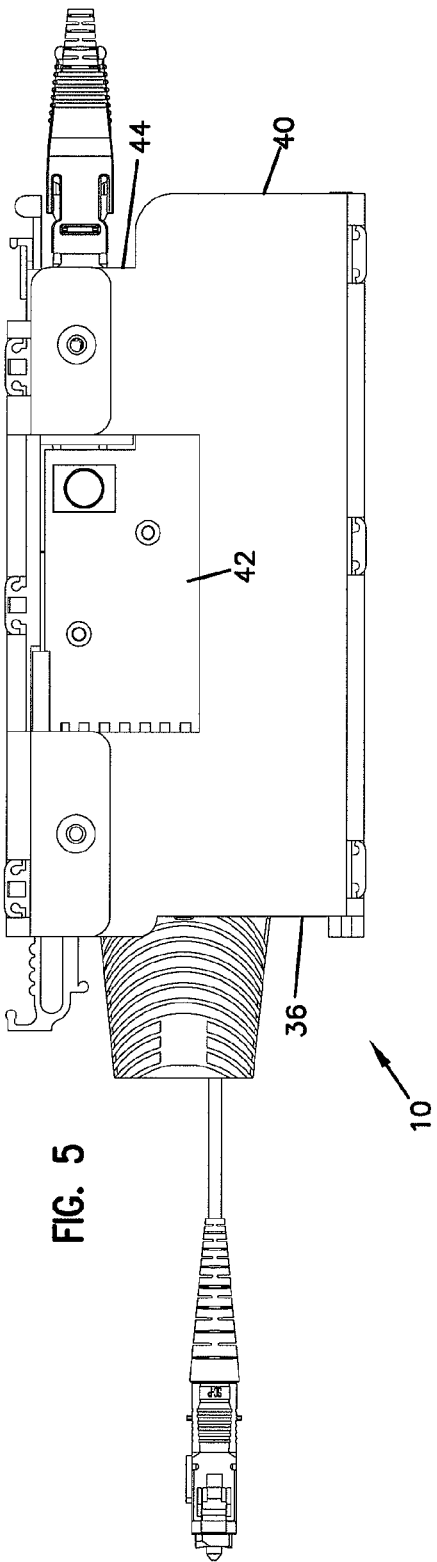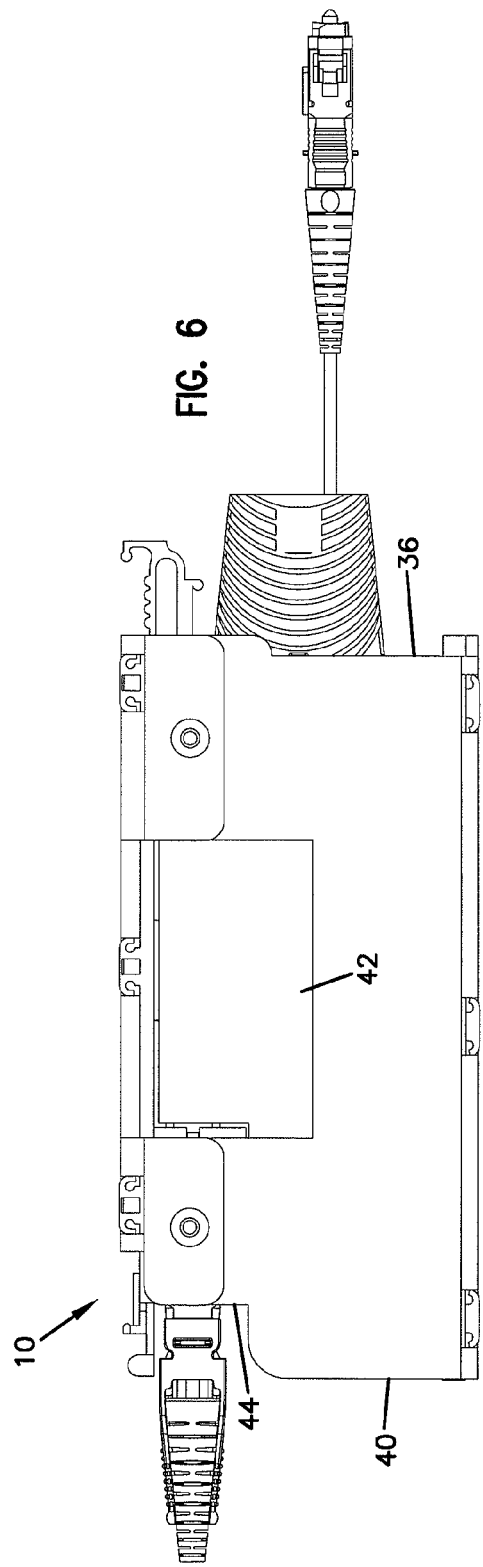

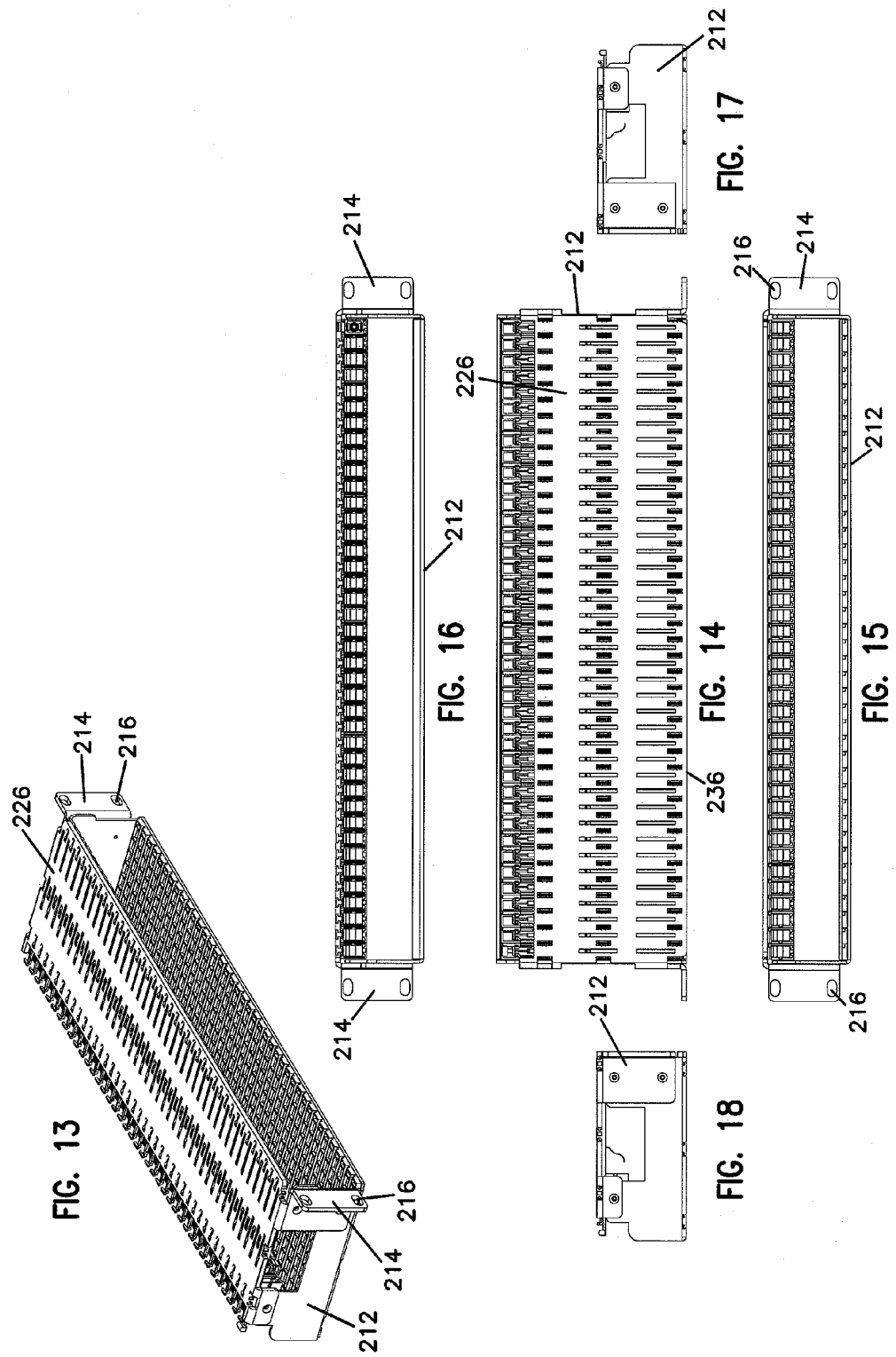

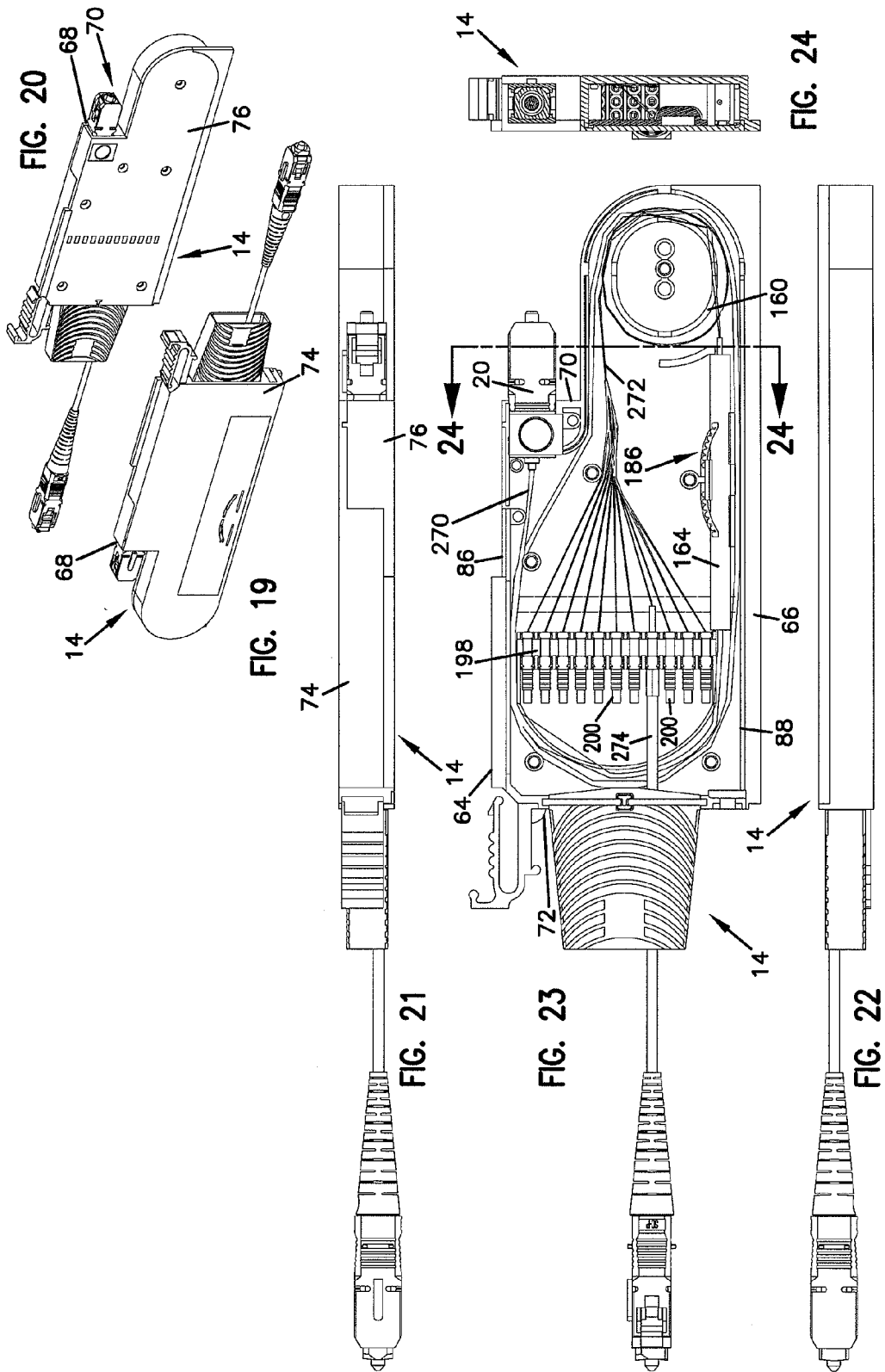

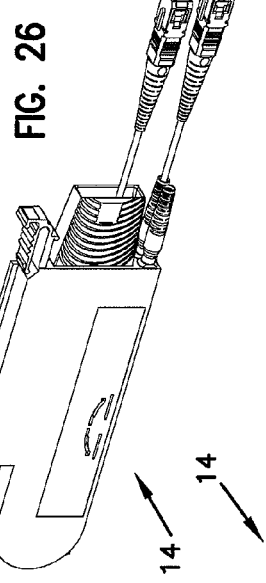
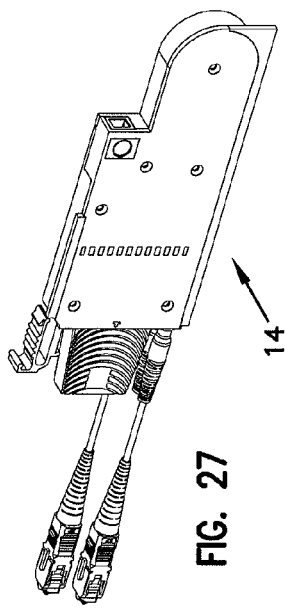
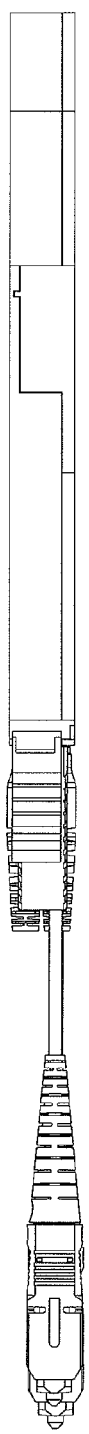
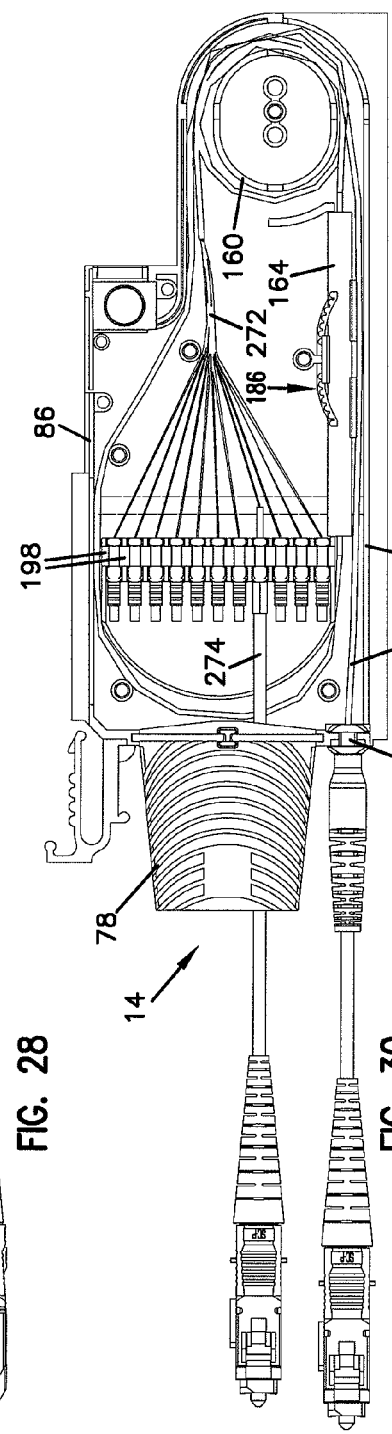
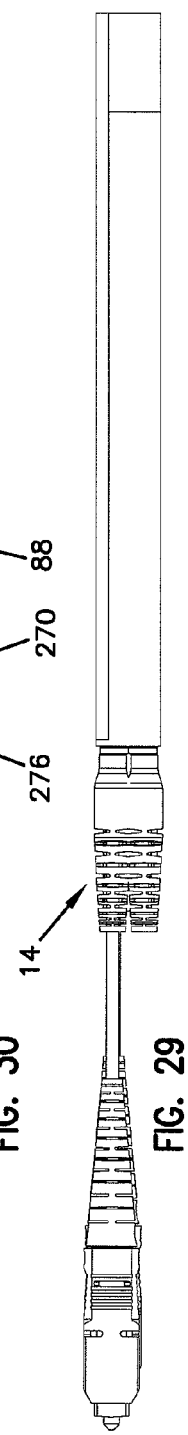

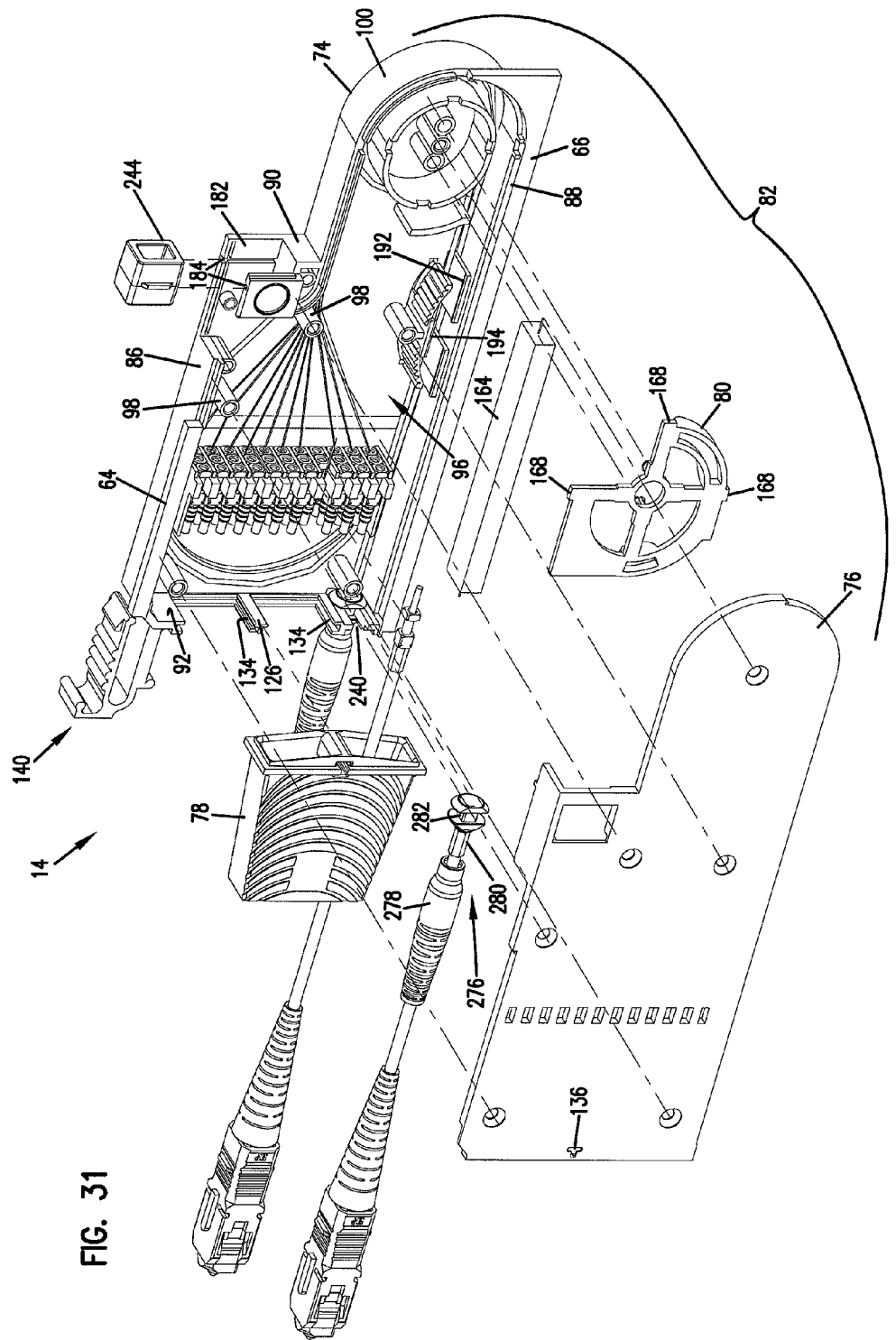

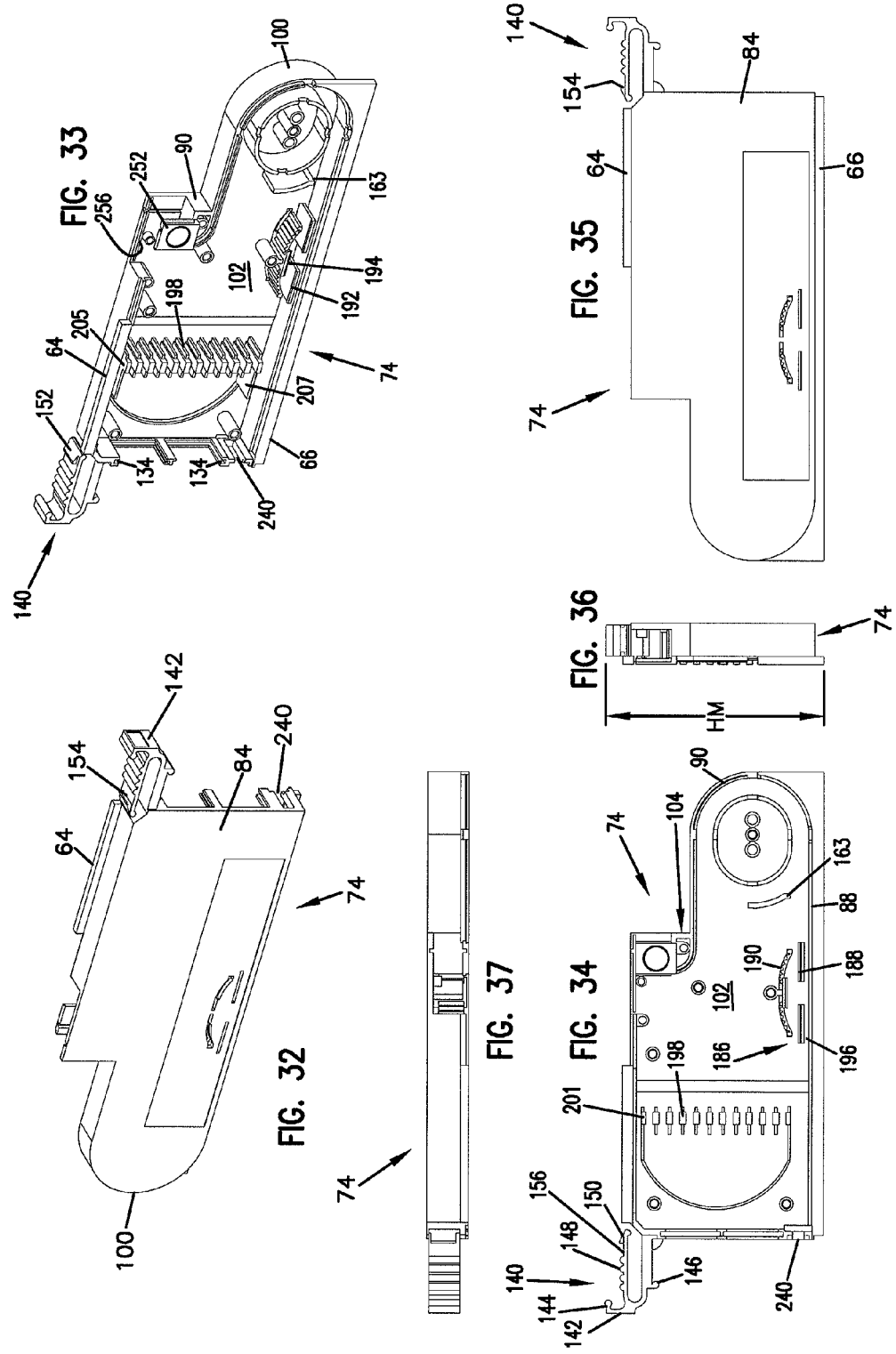

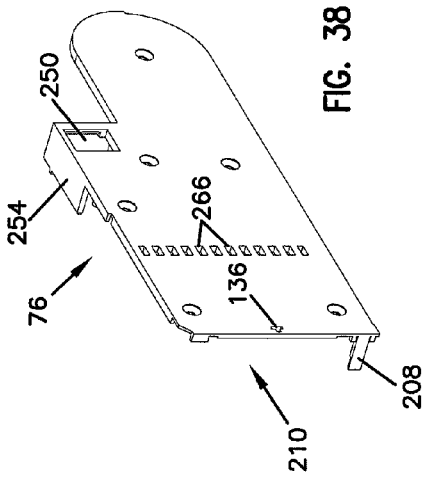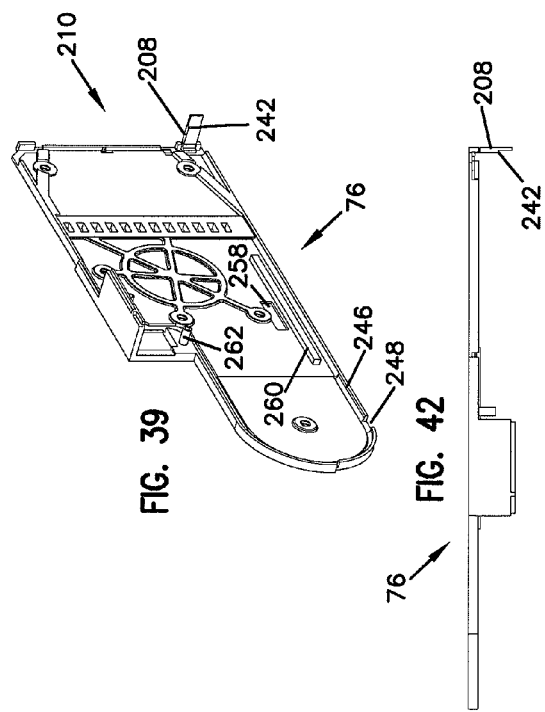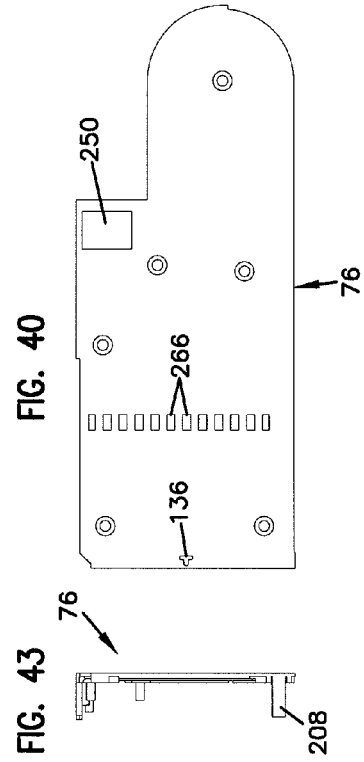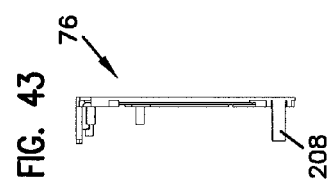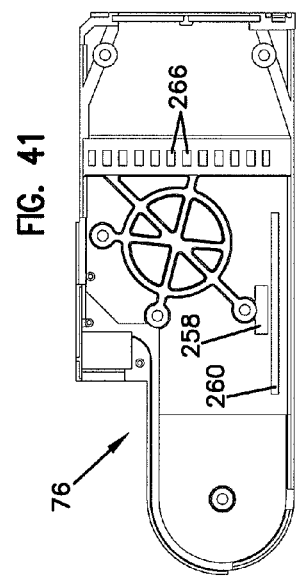

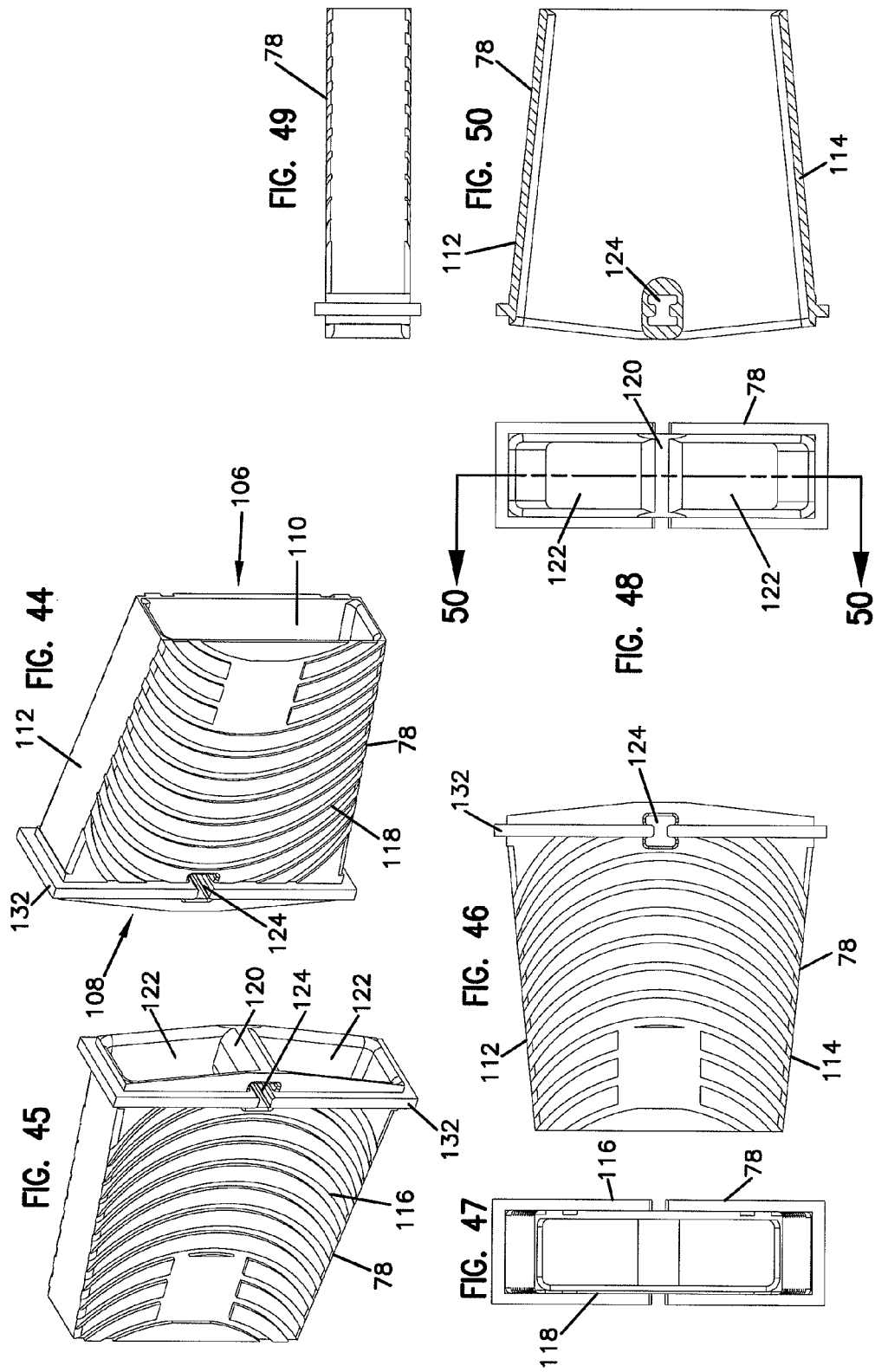

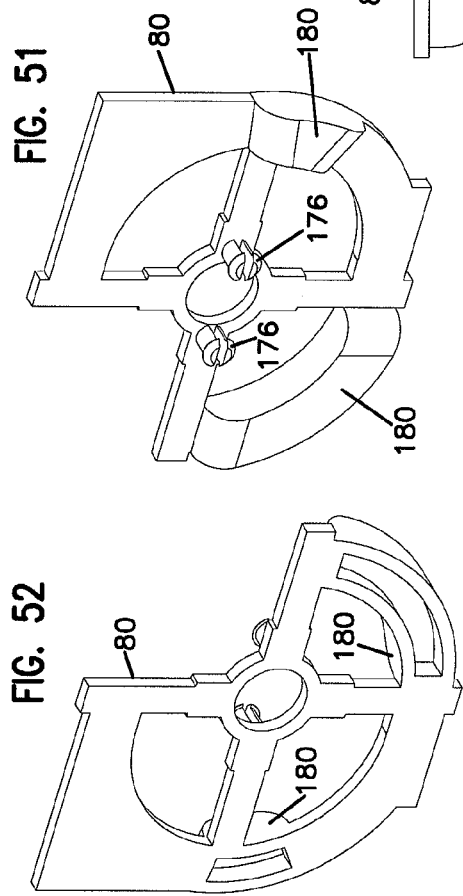
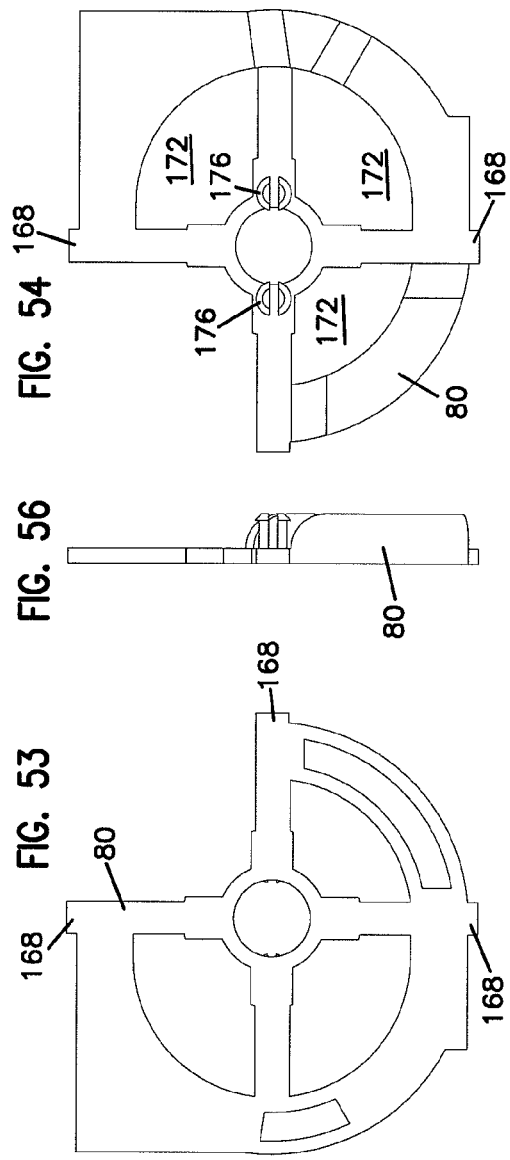

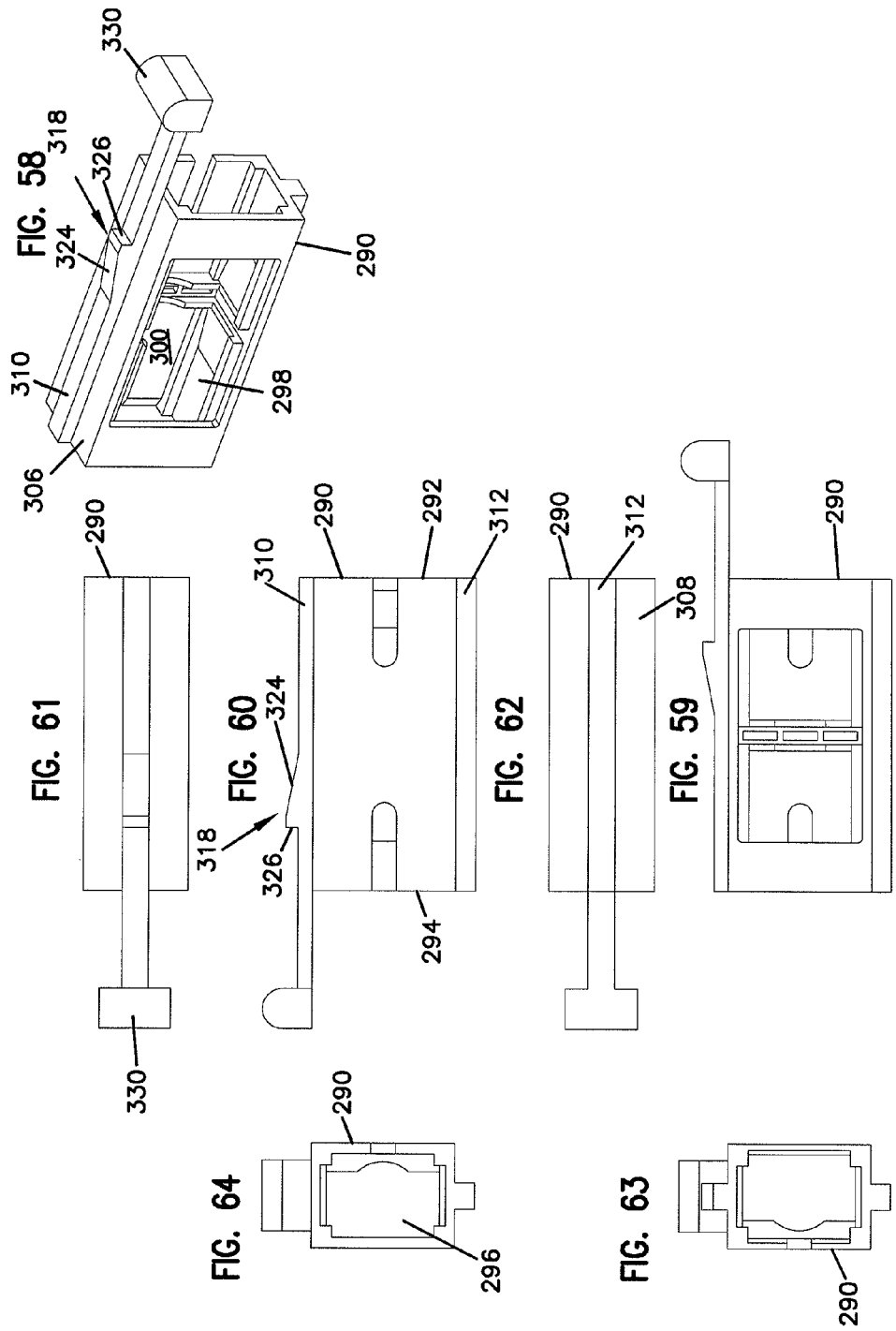

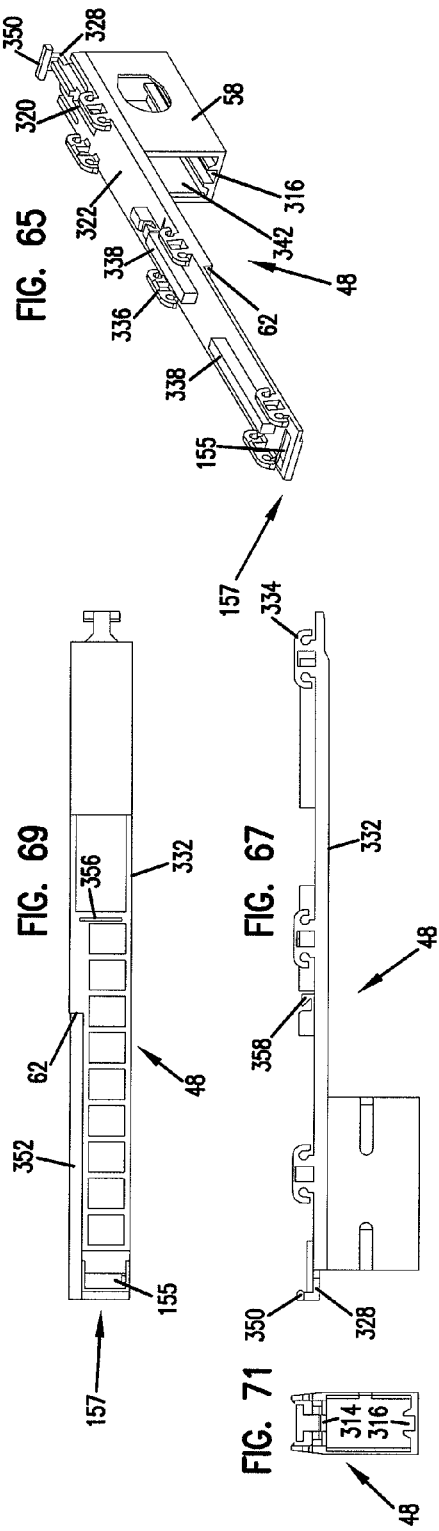

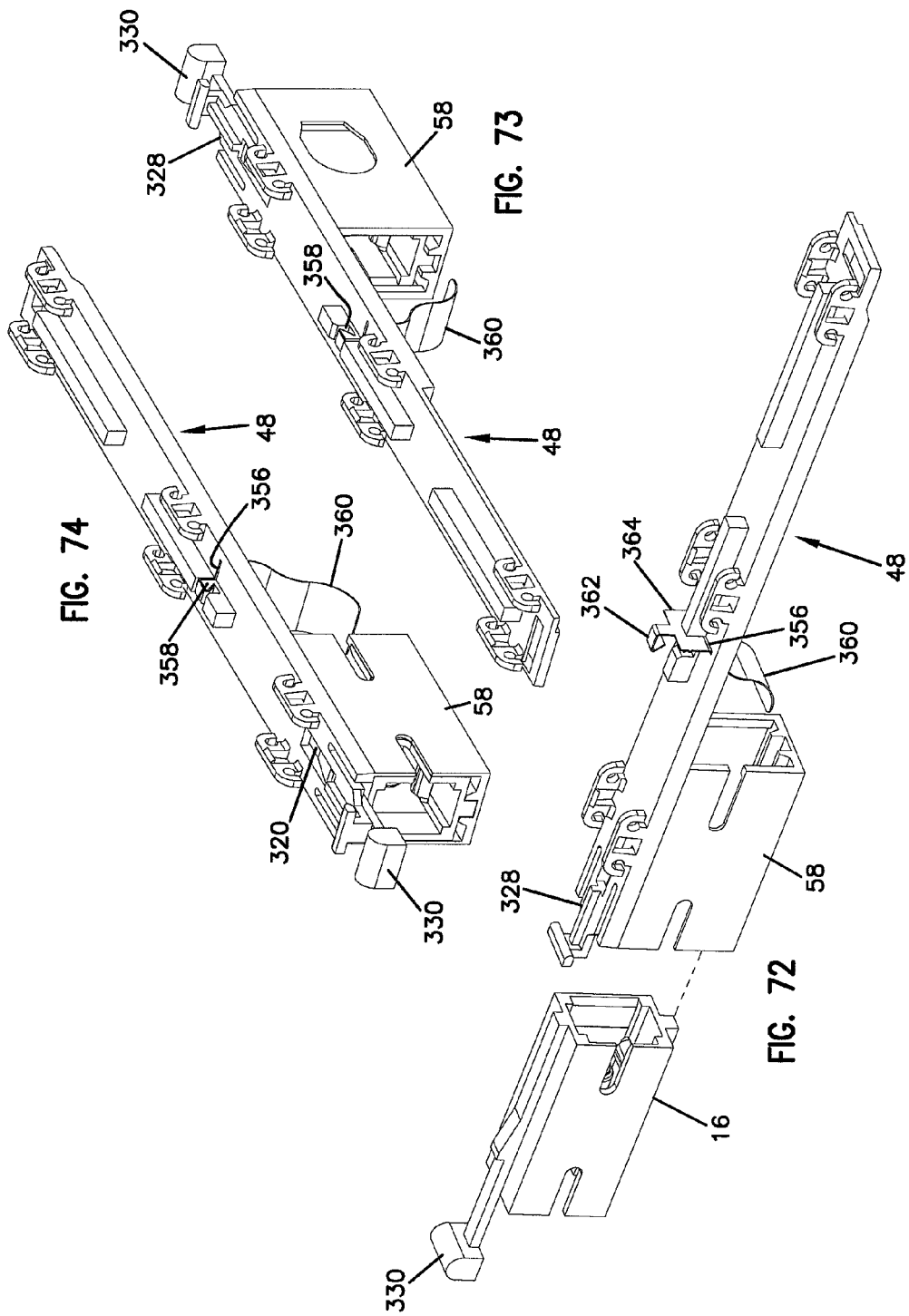

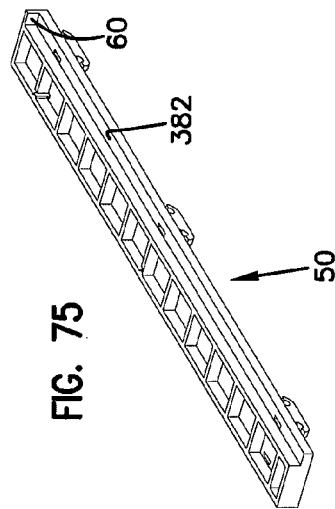
FIG. 75
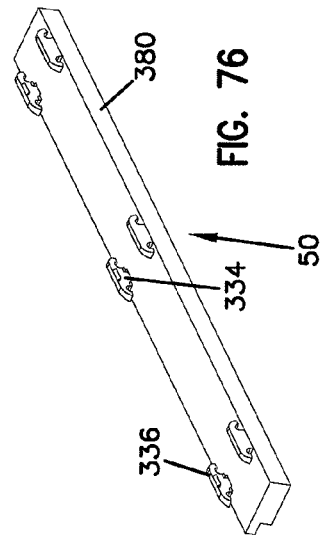
FIG. 76
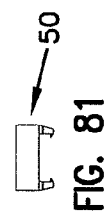
FIG. 81
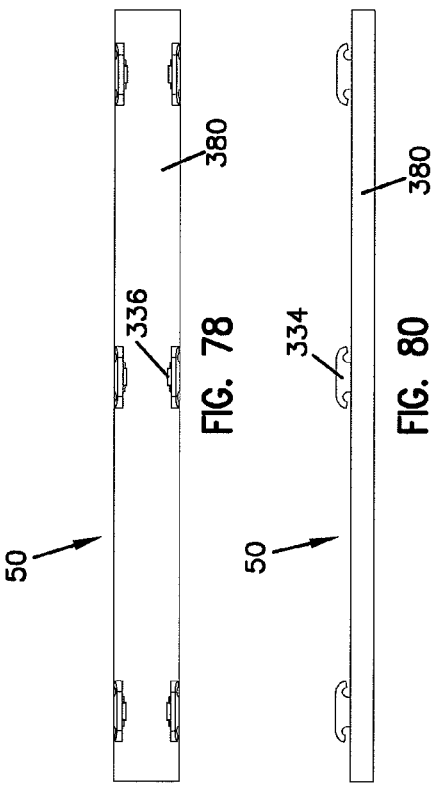
FIG. 78
FIG. 77
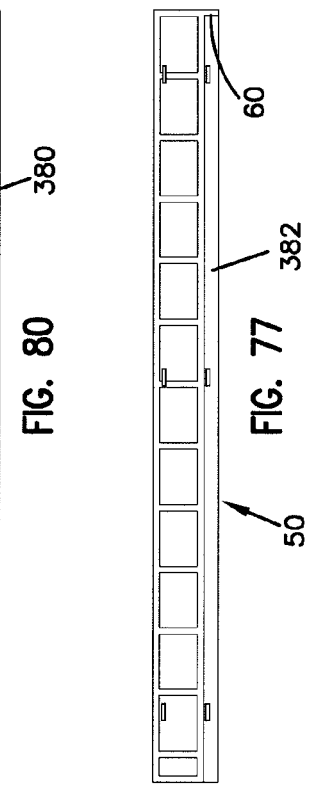
FIG. 80
FIG. 79
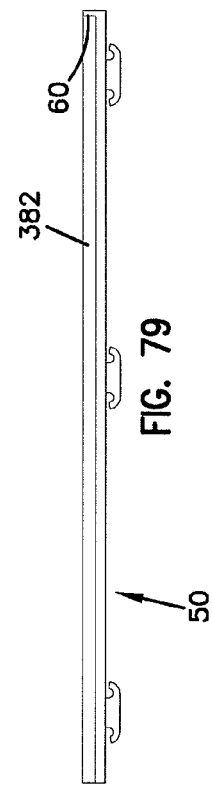

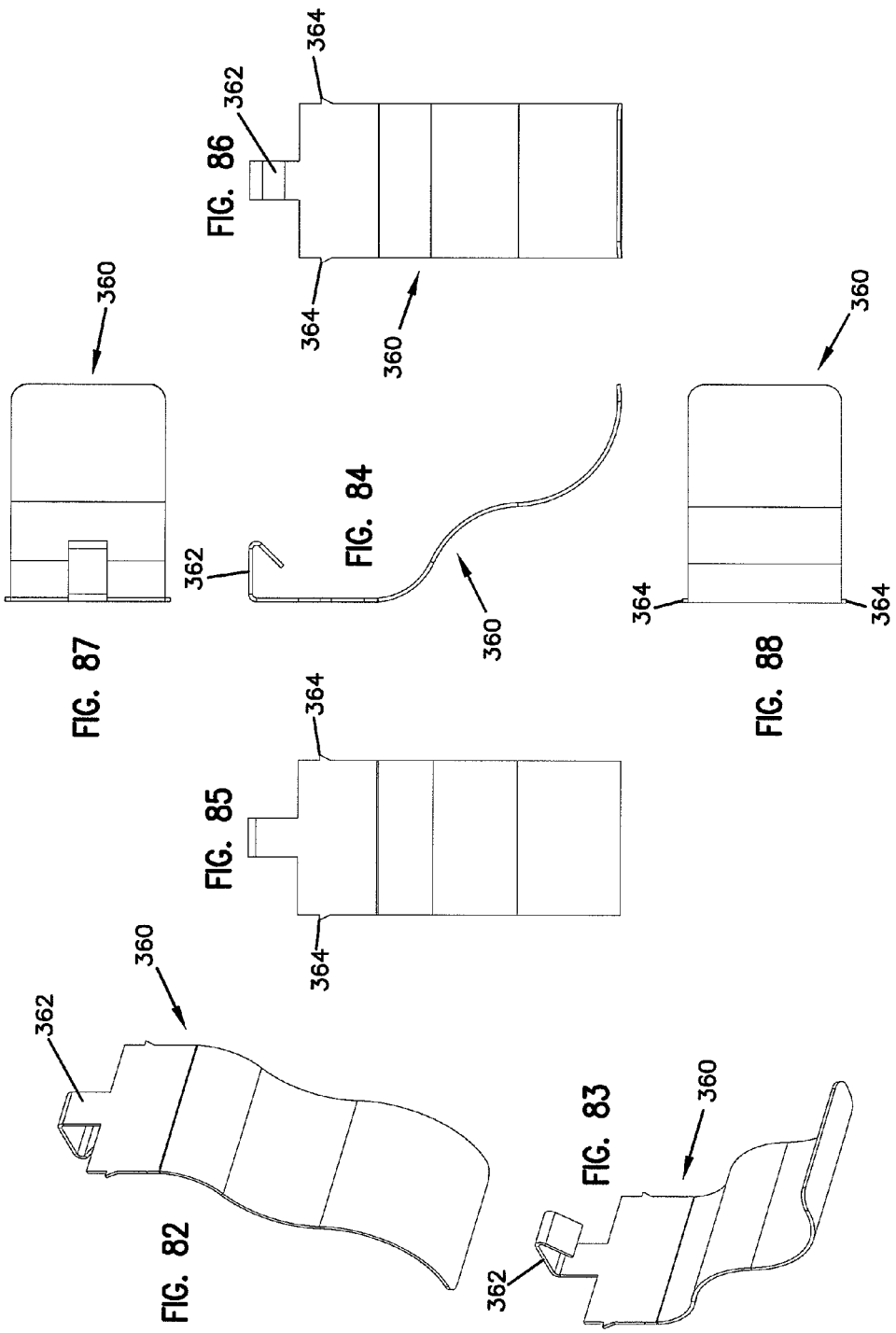

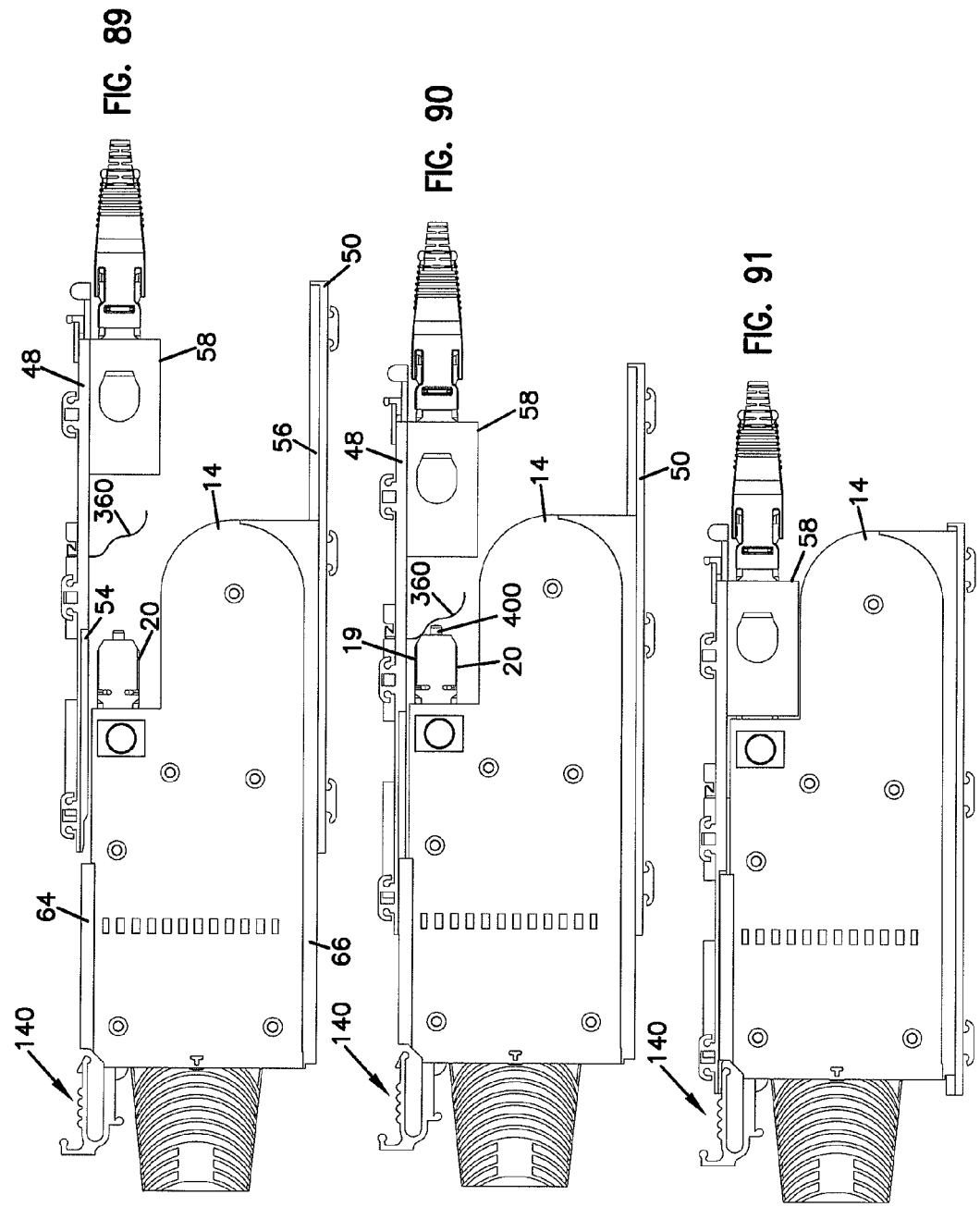

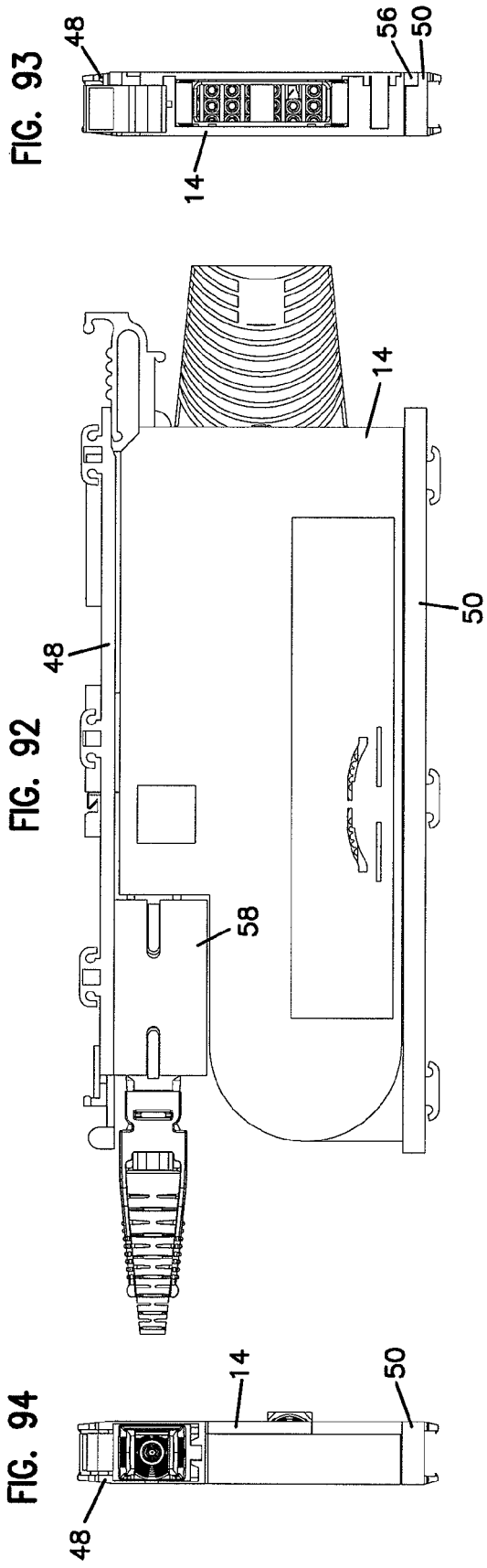

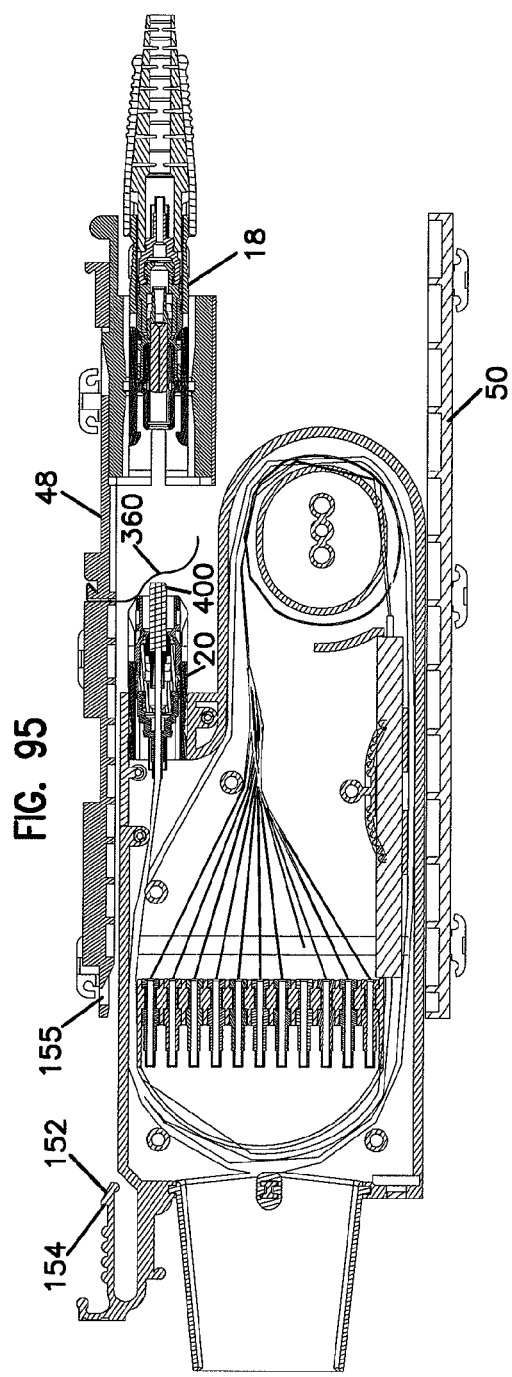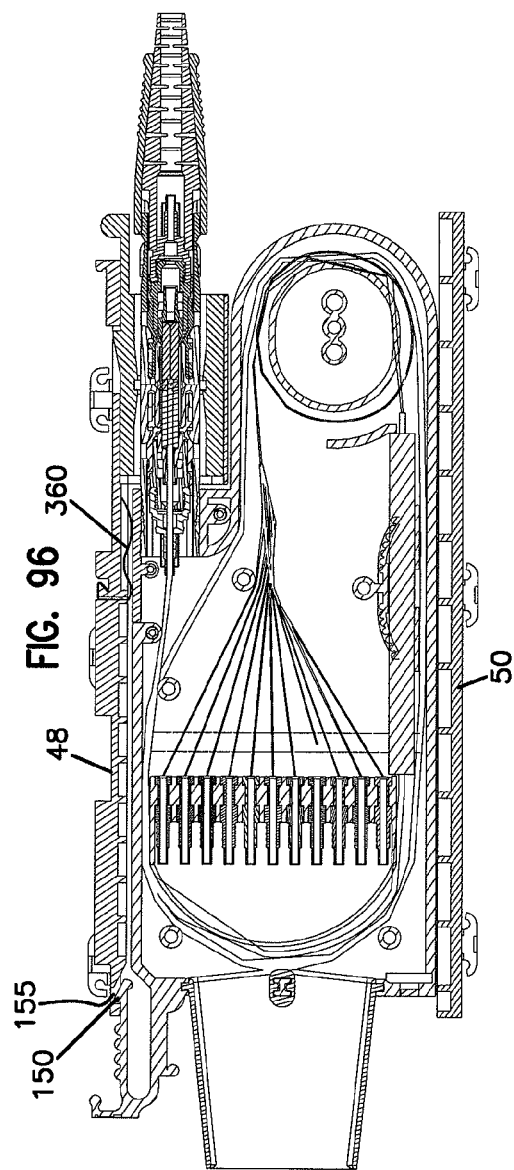

FIBER OPTIC MODULE AND CHASSIS

CROSS REFERENCE TO RELATED APPLICATION

This application claims the benefit of U.S. Provisional Patent Application Ser. No. 61/145,020, filed Jan. 15, 2009, which application is hereby incorporated by reference in its entirety.

FIELD

The present disclosure generally relates to fiber optic telecommunications equipment. More specifically, the present disclosure relates to fiber optic modules and chassis for holding fiber optic modules.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While the chassis may accept several modules, the initial installation may only include fewer modules mounted in the chassis, or enough to serve current needs. These chassis may be configured with limited access to one or more sides, or may be mounted in cramped locations. In addition, some of these chassis may be pre-configured with the maximum capacity of transmission cables to accommodate and link to modules which may be installed in the future. Since it is desirable to have access to components within the chassis for cleaning during the installation of a new module, some provision or feature of the chassis will desirably permit a user to access and clean the connectors of these pre-connectorized and pre-installed transmission cables.

While the demand for added capacity is growing rapidly, this demand is being met in part by increasing the density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Further improvements in adding fiber optic capacity and increasing density are desired.

SUMMARY

The present disclosure relates to a telecommunications assembly including a chassis and a plurality of modules mounted within the chassis. The modules include one or more fiber optic connectors. Within an interior of the chassis at each mounting location are positioned corresponding fiber optic adapters. Inserting the module through a front opening of the chassis at a mounting location positions the one or more connectors of the module for insertion into and mating with the adapters of the chassis.

According to one example embodiment, the telecommunications assembly disclosed herein includes a chassis with a top wall, a bottom wall, a front opening, a rear opening, and first and second transverse sidewalls extending between the front and rear openings, the top wall and bottom walls defining slots. Upper mounting guides defining upper key slots between adjacent upper guides and lower mounting guides defining lower key slots between adjacent lower guides are mounted to the top and bottom walls. The upper and lower guides define snap-fit structures inserted into the slots defined on the top and bottom walls for mounting the upper and lower guides to the chassis. At least one of the upper and the lower mounting guides defines adapter mounts for slidably receiving fiber optic adapters through the rear opening. Fiber optic modules are slidably received within the chassis through the front opening and each module is slidably inserted into the upper and lower key slots of the chassis, each module removable from the chassis through the front opening. A fiber optic adapter that is separate from the module may be slidably received within the chassis through the rear opening into one of the adapter mounts, the fiber optic adapter removable through the rear opening. The module may include at least one connector that protrudes from the module that is adapted to be inserted into the adapter when the module is inserted into the chassis.

The present disclosure further relates to a method of mounting a telecommunications module within a chassis.

BRIEF DESCRIPTION OF THE DRAWINGS

The accompanying drawings, which are incorporated in and constitute a part of the description, illustrate several aspects of the disclosure and together with the detailed description, serve to explain the principles of the invention. A brief description of the drawings is as follows:

FIG. 3 is a front view of the telecommunications assembly of FIG. 1;

FIG. 4 is a rear view of the telecommunications assembly of FIG. 1;

FIG. 5 is a right side view of the telecommunications assembly of FIG. 1;

FIG. 6 is a left side view of the telecommunications assembly of FIG. 1;

FIG. 13 is a front perspective view of a third embodiment of a chassis configured to house a plurality of the fiber optic splitter modules shown in FIG. 1, the chassis shown with one of the adapters mounted therein;

FIG. 14 is a top view of the chassis of FIG. 13;

FIG. 15 is a front view of the chassis of FIG. 13;

FIG. 16 is a rear view of the chassis of FIG. 13;
FIG. 17 is a right side view of the chassis of FIG. 13;
FIG. 18 is a left side view of the chassis of FIG. 13;
FIG. 19 is a front perspective view of one of the fiber optic splitter modules of FIG. 1;
FIG. 20 is a rear perspective view of the fiber optic splitter module of FIG. 19;
FIG. 21 is a top view of the fiber optic splitter module of FIG. 19;
FIG. 22 is a bottom view of the fiber optic splitter module of FIG. 19;
FIG. 23 is a right side view of the fiber optic splitter module of FIG. 19, shown without a cover exposing the interior features of the fiber optic splitter module including routing of a fiber optic cable within the fiber optic splitter module;
FIG. 24 is a cross-sectional view taken along section line 24-24 of FIG. 23;
FIG. 26 illustrates a front perspective view of the fiber optic splitter module of FIGS. 19-25, the fiber optic splitter module configured as a front-input module having two front signal input locations that are configured in a stacked arrangement extending from the right side to the left side of the module;
FIG. 27 is a rear perspective view of the fiber optic splitter module of FIG. 36;
FIG. 28 is a top view of the fiber optic splitter module of FIG. 26;
FIG. 29 is a bottom view of the fiber optic splitter module of FIG. 26;
FIG. 30 is a right side view of the fiber optic splitter module of FIG. 26, shown without a cover exposing the interior features of the fiber optic splitter module including routing of a fiber optic cable within the fiber optic splitter module;
FIG. 31 is an exploded view of the fiber optic splitter module of FIG. 26;
FIG. 32 is a front perspective view of the main housing portion of the fiber optic splitter module of FIGS. 19-31, the main housing portion shown in isolation without the internal components mounted therein;
FIG. 33 is a rear perspective view of the main housing portion of FIG. 32;
FIG. 34 is a right side view of the main housing portion of FIG. 32;
FIG. 35 is a left side view of the main housing portion of FIG. 32;
FIG. 36 is a rear view of the main housing portion of FIG. 32;
FIG. 37 is a top view of the main housing portion of FIG. 32;
FIG. 38 is a front perspective view of the cover of the fiber optic splitter module of FIGS. 19-31;
FIG. 39 is a rear perspective view of the cover of FIG. 38;
FIG. 40 is a right side view of the cover of FIG. 38;
FIG. 41 is a left side view of the cover of FIG. 38;
FIG. 42 is a top view of the cover of FIG. 38;
FIG. 43 is a front view of the cover of FIG. 38;
FIG. 44 is a front perspective view of the cable exit structure of the fiber optic splitter module of FIGS. 19-31;
FIG. 45 is a rear perspective view of the cable exit structure of FIG. 44;
FIG. 46 is a right side view of the cable exit structure of FIG. 44;
FIG. 47 is a front view of the cable exit structure of FIG. 44;
FIG. 48 is a rear view of the cable exit structure of FIG. 44;
FIG. 49 is a top view of the cable exit structure of FIG. 44;
FIG. 50 is a cross-sectional view taken along section line 50-50 of FIG. 48;
FIG. 51 is a front perspective view of a fiber retainer configured to be coupled to the main housing portion of the fiber optic splitter module as shown in FIG. 25;
FIG. 52 is a rear perspective view of the fiber retainer of FIG. 51;
FIG. 53 is a right side view of the fiber retainer of FIG. 51;
FIG. 54 is a left side view of the fiber retainer of FIG. 51;
FIG. 55 is a top view of the fiber retainer of FIG. 51;
FIG. 56 is a rear view of the fiber retainer of FIG. 55;
FIG. 58 is a rear perspective view of a main body of the adapter of FIG. 57, the main body of the adapter shown without the internal components of the adapter or the cover panel mounted;
FIG. 59 is a right side view of the main body of the adapter of FIG. 58;
FIG. 60 is a left side view of the main body of the adapter of FIG. 58;
FIG. 61 is a top view of the main body of the adapter of FIG. 58;
FIG. 62 is a bottom view of the main body of the adapter of FIG. 58;
FIG. 63 is a front view of the main body of the adapter of FIG. 58;
FIG. 64 is a rear view of the main body of the adapter of FIG. 58;
FIG. 65 is a front perspective view of an upper mounting guide configured to be mounted within the chassis shown in FIGS. 1-18, the upper mounting guide configured to guide the fiber optic splitter modules and the adapters into the chassis;
FIG. 66 is a right side view of the upper mounting guide of FIG. 65;
FIG. 67 is a left side view of the upper mounting guide of FIG. 65;
FIG. 68 is a top view of the upper mounting guide of FIG. 65;
FIG. 69 is a bottom view of the upper mounting guide of FIG. 65;
FIG. 70 is a front view of the upper mounting guide of FIG. 65;
FIG. 71 is a rear view of the upper mounting guide of FIG. 65;
FIG. 72 illustrates the adapter of FIG. 57 exploded from the upper mounting guide of FIGS. 65-71, the upper mounting guide shown with a flexible shield being mounted thereon, the shield configured to provide protection against accidental exposure to light;
FIG. 73 is a front perspective view of the upper mounting guide with the adapter and the shield mounted thereon;
FIG. 74 is a rear perspective view of the upper mounting guide with the adapter and the shield mounted thereon;
FIG. 75 is a top perspective view of a lower mounting guide configured to be mounted within the chassis shown in FIGS. 1-18 and configured to cooperate with the upper mounting guide of FIGS. 65-71 for guiding the fiber optic splitter modules into the chassis;
FIG. 76 is a bottom perspective view of the lower mounting guide of FIG. 75;
FIG. 77 is top view of the lower mounting guide of FIG. 75;
FIG. 78 is a bottom view of the lower mounting guide of FIG. 75;
FIG. 79 is a right side view of the lower mounting guide of FIG. 75;

FIG. 80 is a left side view of the lower mounting guide of FIG. 75;

FIG. 81 is a rear view of the lower mounting guide of FIG. 75;

FIG. 82 is a front perspective view of the flexible shield shown in FIGS. 72-74, the shield configured to provide protection against accidental exposure to light;

FIG. 83 is a rear perspective view of the flexible shield of FIG. 82;

FIG. 84 is a right side view of the flexible shield of FIG. 82;

FIG. 85 is a front view of the flexible shield of FIG. 82;

FIG. 86 is a rear view of the flexible shield of FIG. 82;

FIG. 87 is a top view of the flexible shield of FIG. 82;

FIG. 88 is a bottom view of the flexible shield of FIG. 82;

FIG. 89 illustrates a fiber optic splitter module partially inserted within the chassis of FIG. 1, the chassis including an adapter mounted thereon, the fiber optic splitter module shown in a position prior to the connector of the splitter module having contacted a shield located within the chassis;

FIG. 90 illustrates the fiber optic splitter module of FIG. 89, shown in a position within the chassis with the connector of the fiber optic splitter module making initial contact with the shield located within the chassis;

FIG. 91 illustrates the fiber optic splitter module of FIG. 89, shown in a fully inserted position within the chassis;

FIG. 92 a left side view of the fiber optic splitter module of FIG. 91 shown fully inserted into the chassis;

FIG. 93 is a front view of the fiber optic splitter module of FIG. 91 shown fully inserted into the chassis;

FIG. 94 is a rear view of the fiber optic splitter module of FIG. 91 shown fully inserted into the chassis;

FIG. 95 is a side cross-sectional view of the fiber optic splitter module of FIG. 90 within the chassis, taken through the center of the fiber optic splitter module; and FIG. 96 is a side cross-sectional view of the fiber optic splitter module of FIG. 91 within the chassis, taken through the center of the fiber optic splitter module.

DETAILED DESCRIPTION

Figure 1:
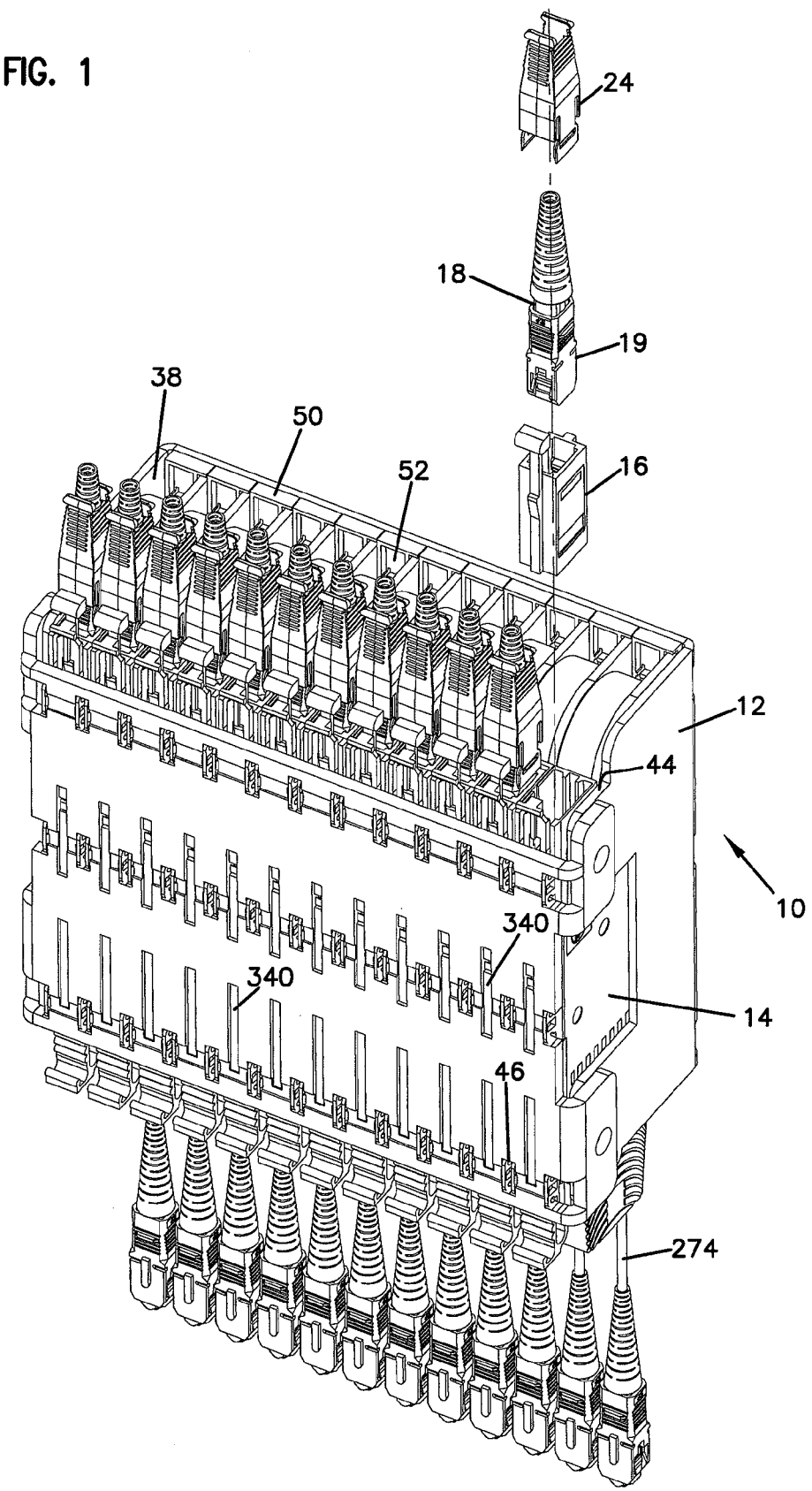
FIG. 1 is a rear perspective view of a telecommunications assembly with a plurality of fiber optic splitter modules installed within a chassis, with one of the adapters exploded out of the telecommunications assembly.

Reference will now be made in detail to exemplary aspects of the present disclosure which are illustrated in the accompanying drawings. Wherever possible, the same reference numbers will be used throughout the drawings to refer to the same or similar parts.

FIGS. 1-6 illustrate a telecommunications assembly 10 that includes a telecommunications chassis 12 and a plurality of fiber optic splitter modules 14 adapted to be mounted within the chassis 12. The fiber optic splitter modules 14 are configured to be slidably inserted within the chassis 12 and be optically coupled to adapters 16 mounted within the chassis 12. Each adapter 16 mounted within the chassis 12 forms a connection location between a connector 18 terminated to an incoming fiber optic cable and a connector 20 of the splitter module 14 as will be discussed in further detail below.

In FIGS. 1-6, the splitter modules 14 mounted within the chassis 12 of the telecommunications assembly 10 are shown with a connectorized cable 274 exiting each of the modules 14. In FIG. 1, one of the adapters 16 is shown exploded from the chassis 12 of the telecommunications assembly 10. The adapters 16 are shown in FIG. 1 with a connector 18 and a grip extension 24 coupled thereto. The grip extensions 24 are configured to add length to the outer housing 19 of the connectors 18 to facilitate access to individual connectors 18 in dense environments such as the telecommunication assembly 10 of the present disclosure. Further details of the grip extension 24 are described in U.S. Pat. No. 7,418,181, the entire disclosure of which is incorporated herein by reference.

Still referring to FIGS. 1-6, the chassis 12 of the telecommunications assembly 10 includes a top wall 26 and a bottom wall 28 extending between a pair of opposing transverse sidewalls, the right sidewall 30 and the left sidewall 32. According to one embodiment, the bottom wall 28 and the sidewalls 30, 32 may be formed from a single bent sheet of metal and the top wall 26 may be a separate piece attached to the transverse sidewalls 30, 32 to enclose the four sides of the chassis 12. It should be noted that the chassis 12 may be formed in a variety of different ways and the depicted embodiment should not be used to limit the inventive aspects of the disclosure.

The chassis 12 includes an opening 34 at a front end 36 and an opening 38 at a rear end 40 thereof. According to one embodiment, the fiber optic splitter modules 14 are inserted into the chassis 12 through the front opening 34 and the adapters 16 are inserted through and mounted adjacent the rear opening 38 of the chassis 12. Sidewalls 30, 32 each include an opening 42 exposing the modules 14 when the modules 14 have been mounted within the chassis 12. Sidewalls 30, 32 of the chassis 12 also define an inset portion 44 at the rear end 40 of the chassis 12 to facilitate access to the adapters 16.

As will be described herein in further detail below, the top and bottom walls 26, 28 of the chassis 12 include slots 46 for receiving portions of upper and lower mounting guides 48, 50, respectively. The upper and the lower mounting guides 48, 50 are configured to be removably mounted to the chassis 12 and guide the fiber optic splitter modules 14 and the adapters 16 into the chassis 12.

In FIGS. 1-6, the chassis 12 is shown with twelve fiber optic splitter modules 14 mounted therein. It should be noted that in other embodiments, the chassis may be sized to hold a larger or a smaller number of splitter modules 14, and, thus, have differing widths. For example, in FIGS. 7-12, a chassis 112 configured to hold twenty-four splitter modules 14 and adapters 16 is shown. The chassis 112 shown in FIGS. 7-12 includes features similar to that of the chassis 12 shown in FIGS. 1-6.

In FIGS. 13-18, a chassis 212 configured to hold forty splitter modules 14 and adapters 16 is shown. The chassis 212 shown in FIGS. 13-18 is configured as a rack-mount structure and is designed to fit in a standard 19-inch telecommunications rack, occupying one standard unit (RU) of rack space within the rack. In such an embodiment, the chassis 212 may include a height between about 2 and 3 inches. More preferably, the chassis 212 may include a height of about 2.3 inches or about 2.322 inches. As shown, the chassis 212 of FIGS. 13-18 includes mounting flanges 214 with fastener holes 216 located at the right and left sides, adjacent the front end 236 of the chassis 212 for mounting the chassis 212 to a telecommunications rack. As shown, according to one embodiment, the mounting flanges 214 may be formed as extensions of the top plate defining the top wall 226 of the chassis 212.

It should be noted that, aside from certain differences such as the mounting flanges 214, the chassis 212 shown in FIGS. 13-18 includes features similar to that of the chassis 12, 112 shown in FIGS. 1-6 and 7-12. Also, the embodiments of the chassis 12, 112 shown in FIGS. 1-6 and 7-12 may include features found on the chassis 212 of FIGS. 13-18 such as the rack-mounting features.

Referring back to FIGS. 1-6, the chassis 12 includes a plurality of mounting locations 52 for slidably receiving the splitter modules 14 and the adapters 16. Each mounting location 52 includes an upper mounting guide 48 that is removably coupled to the top wall 26 and a lower mounting guide 50 that is removably coupled to the bottom wall 28 of the chassis 12. The upper and the lower mounting guides 48, 50 cooperate to guide the splitter modules 14 into the chassis 12. As shown in FIGS. 1-7, adjacently placed upper guides 48 and adjacently placed lower guides 50 define upper and lower guide slots 54, 56, respectively, for guiding the splitter modules 14 into the chassis 12. The upper mounting guides 48 also include adapter mounts 58 for guiding the adapters 16 into the chassis 12 from the rear end 40 of the chassis 12.

The upper and the lower slots 54, 56 are configured to receive mounting flanges of the splitter modules to align modules 14 with other components within chassis 12 (e.g., adapters 16) to mate with pre-connectorized and/or pre-installed transmission cables. Details of the upper mounting guides 48 and the lower mounting guides 50 will be discussed further below. As will be discussed, the lower mounting guides 50 defining the lower slots 56 include stops 60 adjacent the rear end 40 of the chassis 12 to prevent further advancement of the splitter modules 14 within the chassis 12 once the connectors 20 of the modules 14 have been coupled to the adapters 16 (see FIGS. 1, 75, 77, and 79). Similarly, the upper mounting guides 48 defining the upper slots 54 also include stops 62 to prevent further advancement of the splitter modules 14 within the chassis 12 (see FIGS. 65, 66, and 69). The upper flanges 64 of the splitter modules 14 include a shorter length than the lower flanges 66. Similarly, the slots 54 defined by the upper mounting guides 48 include a shorter length than the slots 56 defined by the lower mounting guides 50. In this manner, the slots 54, 56 and the mounting flanges 64, 66 of the fiber optic splitter modules 14 provide a keying system to ensure that modules 14 are inserted into the chassis 12 in the correct orientation.

FIGS. 19-25 illustrate one of the fiber optic splitter modules 14 having examples of inventive aspects in accordance with the present disclosure. The splitter module shown in FIGS. 19-25 is configured as a rear-input module having a signal-input location 68 that is located adjacent the rear 70 of the module 14 for inputting a fiber optic signal into the module 14. As will be described in further detail, the module can be configured as a front-input module that has signal-input locations adjacent the front 72 of the module. For example, FIGS. 26-31 illustrate the module configured as a front-input module.

It should be noted that the splitter module 14, whether it is configured as a rear-input module or a front-input module, utilizes generally the same module components such as the main housing portion 74 (shown in detail in FIGS. 33-37), the cover 76 (shown in detail in FIGS. 38-43), the cable exit structure 78 (shown in detail in FIGS. 44-50), and the fiber retainer 80 (shown in detail in FIGS. 51-56).

Referring now to FIGS. 19-25, the fiber optic splitter module 14 includes a splitter module housing 82. Splitter module housing 82 includes the main housing portion 74 (shown in isolation in FIGS. 33-37) and the removable cover 76 (shown in isolation in FIGS. 38-43).

The main housing portion 74 includes a first transverse sidewall 84 (i.e., a left sidewall) extending between a top wall 86, a bottom wall 88, a rear wall 90, and a front wall 92. Removable cover 76 defines a second transverse wall 94 (i.e., a right sidewall) of the splitter module housing 82 and closes off the open side 96 of the module main housing 74.

Figure 25:
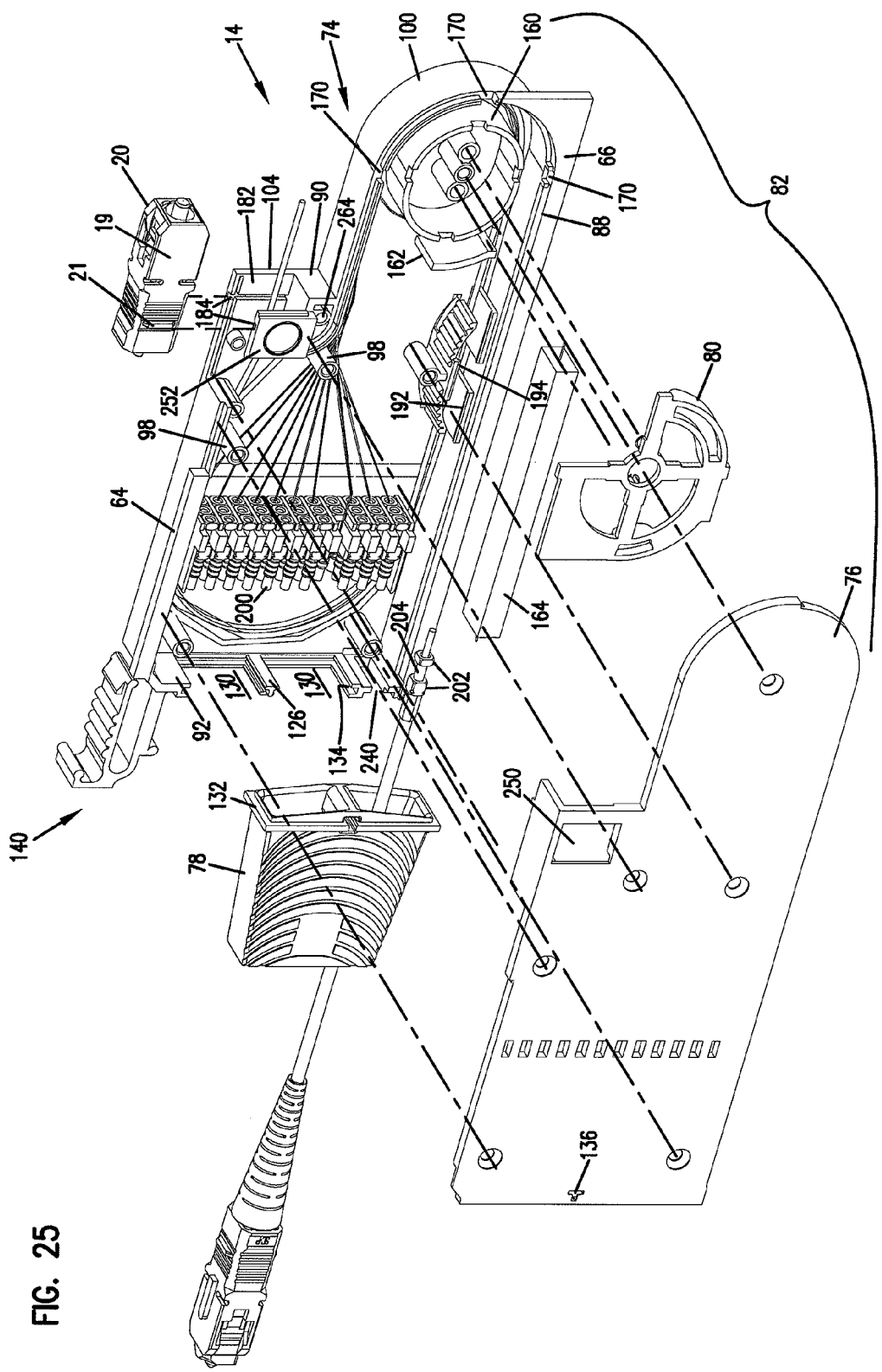
FIG. 25 is an exploded view of the fiber optic splitter module of FIG. 19.
Figure 57:
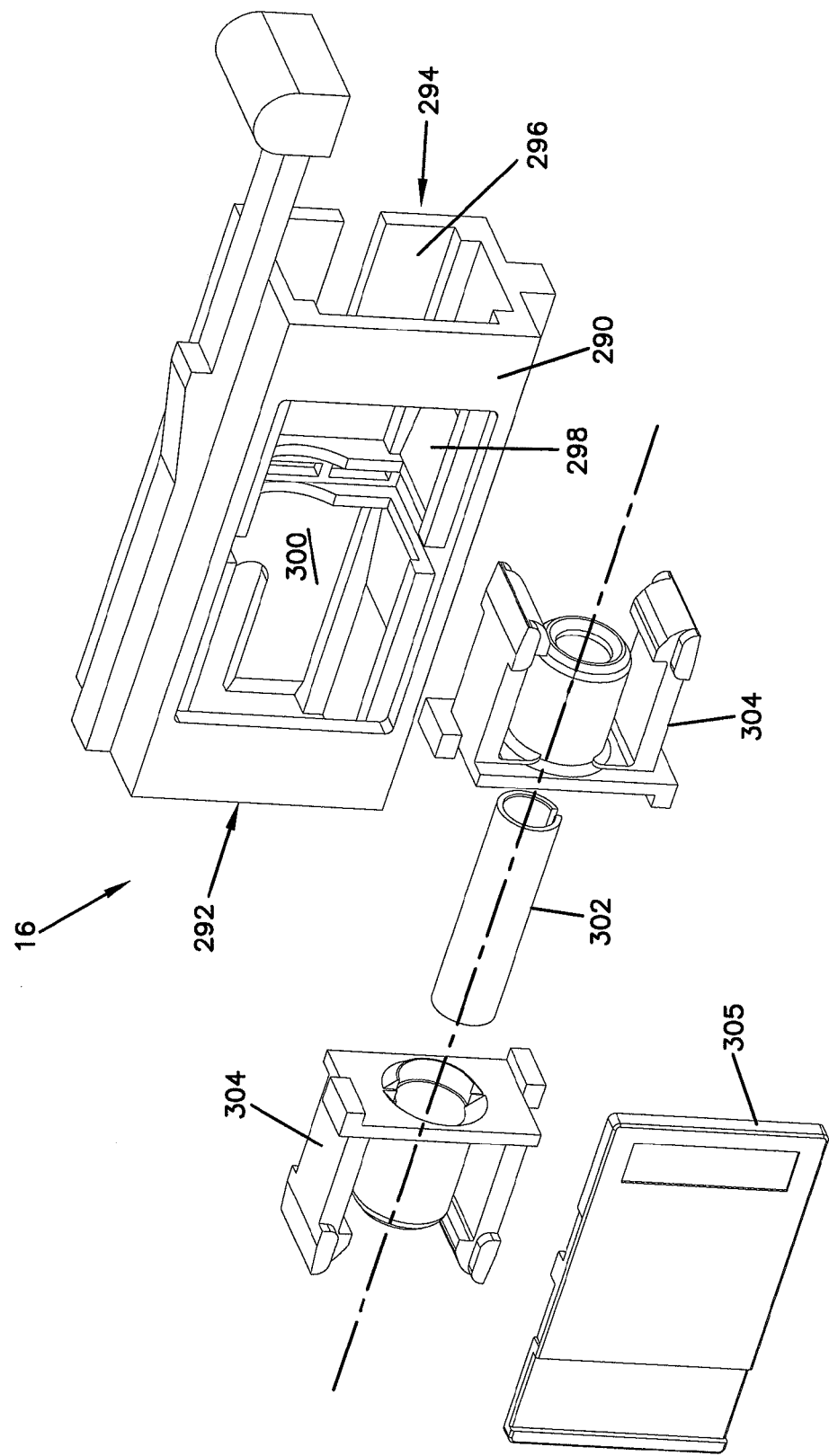
FIG. 57 is an exploded view of one of the adapters of FIG. 1.

The cover 76 is mounted to the main housing portion 74 by fasteners through fastener mounts 98 defined on main housing portion 74 (see FIG. 25). As noted previously, the main housing portion 74 defines a top mounting flange 64 and a bottom mounting flange 66 that extend beyond the first transverse sidewall 84. The top and bottom mounting flanges 64, 66 are configured to slide within the top and bottom slots 54, 56, respectively, defined in the chassis mounting locations 52 for guiding the splitter modules 14 into the chassis 12. Since the top and bottom mounting flanges 64, 66 include different lengths, they may provide a keying system with the slots 54, 56 within the mounting locations 52 of the chassis 12.

A height HM of the module 14 is defined between the top wall 86 and the bottom wall 88. The height HM of the module 14 is preferably configured for mounting the module 14 within a chassis occupying one standard unit (RU) of rack space within a standard telecommunications rack. In such an embodiment, the module 14 may include a height HM of between about 2 and 3 inches. More preferably, the module 14 may include a height HM of about 2.166 inches.

The rear wall 90 of main housing portion 74 includes a curved portion 100 configured to provide bend radius protection to cables within the interior 102 of the main housing 74. The rear wall 90 of the main housing 74 also includes an inset portion 104. As shown, a fiber optic connector 20 positioned at the inset portion 104 protrudes rearwardly from the rear wall 90 for mating with a fiber optic adapter 16 mounted adjacent the rear 40 of the chassis 12.

Each module 14 includes a cable exit structure 78 extending from the front wall 92 of module main housing 74. The cable exit structure 78 is shown in detail in FIGS. 44-50. The cable exit structure 78 defines a front end 106 and a back end 108 and an opening 110 extending therebetween. The cable exit structure 78 defines a top wall 112, a bottom wall 114, a right sidewall 116 and a left sidewall 118. A partition 120 adjacent the back end 108 of the cable exit structure 78 divides the opening 110 into two distinct channels 122 at the rear end 108. A slot 124 extends through the partition 120 from the right sidewall 116 to the left sidewall 118. The partition 120 may include curved surfaces for guiding cables downwardly and/or upwardly while providing bend radius protection. It should be note that the cable exit structure 78 depicted is one example embodiment and other embodiments may be used. For example, the cable exit structure 78 may be provided to extend all the way from the top wall 86 to the bottom wall 88 such that it also provides access to a recess 240 defined at the front wall of the main housing portion. In such a configuration, the cable exit structure 78 would provide protection to cables coming into the module when the module is used as a front signal input module, as will be discussed in further detail below. When provided as such, more than one partition 120 would be used and the opening 110 would be divided into more than two channels 122, one of the channels being used for the input cable.

As shown in FIG. 25, the slot 124 is configured to receive a projection 126 of the module main housing portion 74 for guiding the cable exit structure 78 onto the main housing portion 74. As shown in FIG. 25, the projection 126 of the main housing 74 divides a portion of the front wall 92 of the main housing 74 into two apertures 130. The cable exit structure 78 is slidably mounted to main housing 74 of module 14 and captured by the cover 76 of module 14. The cable exit structure 78 defines a protruding rear lip 132 that is slidably inserted into recesses 134 defined around the front apertures 130 of the main housing 74. The cover 76 also includes a key slit 136 that receives a portion of the projection 126 of the main housing 74 to capture the cable exit structure 78 against the main housing portion 74. The cable exit structure 78 permits telecommunications cables within the module 14 to be directed outside of the module 14. As shown in FIGS. 21, 22, and 24, the cable exit structure 78 is preferably sized thin enough to fit within the profile of the fiber optic splitter module 14 to preserve the density of the telecommunications assembly 10.

Referring now to FIGS. 33-37, the main housing 74 of the splitter module 14 is illustrated in isolation. The main housing 74 includes an integrally formed flexible latch 140 (i.e., cantilever arm) that is adapted to engage a portion of the chassis 12 to hold module 14 within the chassis 12. Flexible latch 140 also deflects to permit withdrawal of the module 14 from the chassis 12. The latch 140 of module includes a pull handle 142 with top and bottom portions 144, 146 for pulling the module 14 out of the chassis 12, a grip feature 148 for pressing down on the latch 140, and a latching tab 150 that is configured to provide a snap-fit interlock with the chassis 12. The latching tab 150 includes a ramped face 152 that causes latch 140 to elastically deflect downwardly when the module 14 is being inserted into chassis 12. The latching tab 150 also includes a square face 154 that is configured to act as a stop for keeping the module 14 snap-fit within the chassis 12 as will be explained in further detail below. As will be noted below, the space 156 between the square face 154 of the latching tab 150 and the grip feature 148 provides a certain amount of horizontal float for the module 14 within the chassis 12.

The removal of the module 14 from chassis 12 is performed by pressing the grip feature 148 downwardly to clear the square face 154 of tab 150 from a slot 155 adjacent the front end 157 of the upper mounting guide 48, as will be explained hereinafter, and sliding the module 14 away from the chassis 12 by pulling on the top and bottom portions 144, 146 of the handle 142.

Referring back to the exploded view of FIG. 25, the internal components of the fiber optic splitter module 14 are illustrated. Within interior 102 of main housing 74, splitter module 14 includes a first radius limiter 160 (e.g., a spool) adjacent the curved portion 100 of the rear wall 90 of the main housing 74. The splitter module 14 includes a wall 162 adjacent the radius limiter 160. The wall 162 is configured to keep the fiber optic cable coiled around the radius limiter 160, separate from the rest of the interior 102. A bottom portion 163 of the wall 162 is also acts as a guide when placing a fiber optic splitter 164 within the interior 102 of the main housing portion 74.

The fiber retainer 80 may be placed on the main housing portion 74 to keep cables wrapped around the first radius limiter 160. The fiber retainer 80 is shown in detail in FIGS. 51-56. The fiber retainer 80 is generally planar and includes a generally circular shape to match the contour of the curved portion 100 of the rear wall 90 of the main housing 74. The fiber retainer 80 includes a plurality of tabs 168 positioned around the periphery. The tabs 168 are placed within slots 170 formed around the curved portion 100 of the rear wall 90 when positioning the retainer 80 on the main housing 74. The fiber retainer 80 also includes three openings 172 which accommodate portions 174 of the first radius limiter 160 that protrude through the openings 172. When the fiber retainer 80 is placed on the main housing portion 74, it lies flush with the main housing 74 portion and is held thereagainst by the cover 76. The fiber retainer 80 includes snap-fit structures in the form of plugs 176 that radially flex to snap-fit into fastening openings 178 defined on the main housing 74. As shown in FIGS. 51 and 55, the fiber retainer 80 also includes a downwardly protruding portions 180 for keeping the cable down when the retainer 80 is placed on the first radius limiter 160.

Referring back to FIG. 25, as discussed above, a connector 20 of the module 14 projects out from rear wall 90 at the inset portion 104 of the rear wall 90. The connector 20 of the splitter module 14 is slidably inserted into a connector aperture 182 defined at the rear wall 90 of the main housing 74. The aperture 182 defines opposing slots 184 on the right and left sidewalls of the main housing portion 74. Outer housing 19 of the connector 20 includes transverse flanges 21 that are received within the opposing slots 184. Once slidably inserted, the connector 20 is captured within the housing 82 by the cover 76.

As noted above, adjacent the bottom wall 88 of the main housing 74 within the interior 102 is placed an optical component 164 such as a fiber optic splitter or a fan-out. It should be noted that although the modules 14 of the present disclosure are depicted and described as being splitter modules, other types of telecommunications equipment such as combiners, attenuators, equalizers, multiplexers/demultiplexers, etc. may be provided in the modules 14.

The optical component 164 is held within the interior 102 of the main housing 74 by a clamp structure 186 (i.e., bracket). The clamp structure 186 includes a bottom support portion 188 and an upper biasing portion 190 that flexes out to receive the optical component 164. The bottom support portion 188 defines upwardly extending tabs 192 and the upper biasing portion 190 defines a downwardly extending tab 194 that are configured to capture the optical component 164 within the clamp 186 once the component 164 has been placed therein. It should be noted that different optical components may have different thicknesses and may require the use of different sized clamps for holding the optical component in place. The bottom support portion 188 of the clamp structure 186 is positioned to leave a space 196 between the bottom wall 88 of the main housing 74 and the support portion 188 for accommodating fiber optic cables that are routed within the module 14 (see FIG. 23). It should be noted that even though the clamp structure 186 is depicted as a bracket, other types of clamp structures can be used to secure the optical component within the main housing 74. For example, the bottom portion 188 and the upper portion 190 of the clamp structure 186 may include flexible portions having rubberized surfaces for holding the optical component via friction.

Still referring to FIG. 25, the splitter module main housing 74 also includes integrally formed crimp holders 198 (e.g., slots) extending in a stacked arrangement generally from the top wall 86 to the bottom wall 88 of the module main housing 74 (shown best in FIGS. 33 and 34). Crimp elements 200 crimped to ends of cables that are split by the optical component 164 are slidably received into the crimp holders 198 as shown in FIGS. 23 and 25. Each crimp element 200 defines square flanges 202 between which is defined a recessed portion 204. The crimp holders 198 include complementary structure to the crimp elements 200 such that once the crimp elements 200 are slidably inserted into the crimp holders 198, the crimp elements 200 are prevented from moving in a longitudinal direction. Once slidably inserted, crimp elements 200 are held in place by the cover 76 that is mounted to the splitter module main housing 74. In the embodiment shown, there are eleven crimp holding slots 198, each one being able to accommodate up to three crimp elements 200 for a total output capacity of thirty-three cables. As such, a 1:32 fiber optic splitter may be housed within the module 14. Other numbers are possible. Other complementary shapes between the crimp elements 200 and the crimp holding slots 198 are also possible to provide a slidable fit and to prevent axial movement of the crimp elements 200 once inserted therein. The topmost and the bottommost crimp holders 201, 203 define walls 205, 207 adjacent the top wall 86 and the bottom wall 88 of the main housing 74, respectively. The walls 205, 207 are positioned to leave spaces for guiding fiber optic cables during routing of the cables within the module 14.

FIGS. 38-43 illustrate the cover 76 of the fiber optic splitter module 14 in isolation. The cover 76 is configured to be fastened to the module main housing portion 74 for keeping the internal components within the module main housing 74. The cover 76 defines a tab 208 adjacent the front end 210 thereof. The tab 208 is slidably inserted within a recess 240 defined at the front wall 92 of the main housing portion 74 (see FIGS. 25, 33, 38, and 39) to correctly orient the cover 76 with respect to the main housing portion 74. As will be described below, the recess 240 of the main housing portion 74 may also be used as a signal input location for using the module 14 as a front-input module if desired. A front-input configuration of the module 14 is illustrated in FIGS. 26-31. As such, terminated fiber optic cables may be accommodated by and received within the recess 240. In the embodiment shown, two cables may be received within the recess 240 in a stacked arrangement. The tab 208 of the cover 76 that is normally used to close the recess 240 when the module 14 is used a rear-input module, may be cut or trimmed to an appropriate length for accommodating terminated cables entering the module 14 when the module 14 is used as a front-input module.

As shown in FIGS. 38, 39, and 42, the tab 208 may include a stepped configuration with two tiers. The step line 242 indicates the location where the tab 208 may be broken off or cut off to allow enough spacing for one input cable. If one input cable needs to be accommodated, the tab 208 is cut at the step line 242. If two input cables need to be accommodated, the tab 208 must be cut at its base to create enough spacing (see FIGS. 26, 27, and 31). It should be noted that the tab 208 and the recess 240 may be arranged and configured to accommodate any number of input cables. The stepped configuration of the tab 208 serves the purpose of identifying the cut location for accommodating a single input cable and also makes it possible to still use the remainder of the tab 208 to cover the recess 240 if only one input cable is being used.

When the module 14 is used as a front-input module, the aperture 182 at the rear wall 90 of the module 14 that is normally used to receive a fiber optic connector 20 may be covered by an insert piece 244 (see FIG. 31). It should be noted that the cover may be provided with other tabs for covering other portions of the module. For example, the cover 76 may be provided with a tab configured to cover one of the exit channels defined by the cable exit structure 78 if one of the channels is not used for exiting cables. For example, if a 1×16, a 1×4, or a 1×8 splitter is used instead of a 1×32 splitter, one of the channels in the cable exit structure 78 may not be utilized and access thereto from inside the module may be covered by a tab of the cover. Such a tab could be cut down if the channel is needed to be used for exiting cables.

As shown in FIGS. 31 and 38-43, the cover 76 also includes protruding portions 246 defined around the periphery and slots 248 defined between the protruding portions 246 that intermate with corresponding structures located around the periphery of the main housing 74 for correctly placing the cover 76 onto the main housing 74.

As shown in FIGS. 31 and 38-41, the cover 76 defines an opening 250 for receiving a portion 252 of the second transverse sidewall of the main housing 74. The cover 76 also defines a transversely extending portion 254 that is placed within an inset portion 256 of the top wall 86 of the main housing 74.

As shown in FIG. 39, the cover 76 defines a recess 258 for accommodating a portion of the clamp structure 186 that is located on the main housing 74. The cover 76 also includes a protruding elongate portion 260 for abutting against the optical component 164 to keep the optical component 164 against the left sidewall 84 of the main housing 74 when the cover 76 is mounted on the main housing 74. A plug 262 that protrudes from the cover 76 is inserted into an opening 264 defined adjacent the connector aperture 182 of the main housing 74 for alignment purposes.

As shown in FIGS. 31 and 38-41, the cover 76 also defines slots 266 for receiving portions of the structures of the main housing 74 that define the crimp holders 198.

FIG. 23 shows the fiber optic splitter module 14 without the cover 76 exposing the interior features of fiber optic splitter module 14 including a sample routing of a fiber optic cable within the fiber optic splitter module 14.

As shown in FIG. 23, a first cable 270 extends from the connector 20 toward the front end of the module 14, passing through the space defined adjacent the top wall 86 of the module main housing 74. After passing around the crimp holders 198, the cable 270 extends toward the bottom wall 88 and is directed toward the optical component 164 mounted within module housing 82. The cable 270 passes underneath the clamp 186 through the space defined between the bottom wall 88 of the main housing 74 and the clamp 186 toward the first radius limiter 160. After going around the radius limiter 160, the cable 270 is directed toward the front of the module 14. The cable again passes through the space located adjacent the top wall 86 of the main housing 74. After passing around the crimp holders 198, the cable 270 extends toward the bottom wall 88 and is directed into the optical component 164. The optical component 164, as previously discussed, may be a splitter or a fan-out or another type of optical component. In the example embodiment shown and described, the optical component 164 is a fiber optic splitter that splits the signal of a single strand to a plurality of secondary signals. In another embodiment, the first cable may be a multi-strand fiber cable with a plurality of strands of optical fiber and the optical component may be a fanout to separate the individual strands into each of a plurality of second cables.

If a splitter is utilized, the splitter may be a 1×32 splitter. Other splitter configurations such as a 1×16 or 2×16, etc., could be used in other embodiments.

Once the first cable 270 is split, second cables 272 extend from optical component 164 and are looped all the way around first radius limiter 160 before being directed toward the crimp holders 198. From the crimp holders 198, cables 274 crimped to the other ends of the crimps 200 exit the module 14 through the module exit structure 78.

An outside cable may extend to rear end of an adapter 16 within the chassis 12 and be terminated by a connector 18 that is optically connected to the connector 20 of the module 14 through the adapter 16 once module is inserted within chassis 12. It should be noted that the routing of the fiber optic cables within module 14 as shown in FIG. 23 is only one example and other ways of routing the cables within the module 14 are possible.

It should be noted that although the connectors and the adapters depicted herein are of the SC type, other types, formats, styles, and sizes of telecommunications connectors and adapters may be used.

The embodiment of the fiber optic splitter module 14 shown in FIGS. 19-31 is configured such that it can accommodate reduced bend radius fiber. A reduced bend-radius fiber may have a bend radius of about 15 mm whereas a non-reduced bend-radius fiber may have a bend radius of about 30 mm.

As discussed above, the module 14 can be configured as a front-input module that has signal-input locations/connections 276 adjacent the front of the module 14. Referring to FIGS. 26-31, the module 14 is shown configured as a front-input module that may have two front signal-input locations 276 in a stacked arrangement extending from the right sidewall 94 to the left sidewall 84 of the module 14. As described previously, the cover 76 used to cover the main housing 74 of the module 14 defines a single tab 208 adjacent the front end 210 thereof. The tab 208 is normally slidably inserted within the recess 240 defined at the front wall 92 of the main housing portion 74 to correctly orient the cover 76 with respect to the main housing portion 74. However, when the module 14 is desired to be used as a front-input module, the terminated fiber optic cables may be accommodated by and received within the recess 240. The tab 208, which is normally used to cover the recess 240 when the module 14 is used a rear-input module, may be cut or trimmed to an appropriate length for accommodating the terminated cables entering the module. As discussed above, the tab 208 defined on the cover 76 may include a stepped configuration with two tiers. The step line 242 indicates the location where the tab 208 may be broken off or cut off to allow enough room for one input cable. If one input cable needs to be accommodated, the tab 208 is cut at the step line 242 (see FIGS. 38, 39, and 42). If two input cables need to be accommodated, the tab 208 must be cut at its base to create enough spacing. The number of front input connections 276 used may be based on the type of splitter (1×32, etc.) or other optical elements provided in the module housing 82.

It should be noted that the tab 208 of the cover 76 and the recess 240 of the module main housing 74 may be arranged and configured to accommodate any number of input cables. Also, in different embodiments, the tab of the cover and the recess of the module main housing may be reversed so that the tab is provided on the housing and the recess is provided on the cover.

Illustrated in FIG. 31 is an exploded view of an example front input connection 276 for inputting a signal into the module 14. As shown, each input connection 276 includes a boot 278 that mates with a crimp element 280. The crimp element 280 defines a circumferential notch 282 (i.e., recessed portion). The circumferential notch 282 is slidably inserted into the recess 240 defined by the front wall 92 of the module main housing 74. The crimp elements 280 of the input connections 276 are captured by the cover 76 when the cover 76 is mounted on the module main housing 74.

As discussed previously, when the module 14 is used as a front-input module, the aperture 182 that is normally used to receive the fiber optic connector 20 for inputting the input signal may be covered by an insert piece 244 (see FIG. 31).

FIG. 30 shows the fiber optic splitter module 14 without the cover 76 exposing the interior features of fiber optic splitter module 14 when the module is configured as a front-input module. FIG. 30 also illustrates a sample routing of a fiber optic cable within fiber optic splitter module 14.

As shown in FIG. 30, a first cable 270 extends from the front input connection 276 toward the rear end of the module 14, passing underneath the clamp 186 through the space defined between the bottom wall 88 of the main housing 74 and the clamp 186 toward the first radius limiter 160. After going around the radius limiter 160, the cable 270 is directed toward the front of the module 14. The cable 270 passes through the space located adjacent the top wall 86 of the main housing 74. After passing around the crimp holders 198, the cable 270 extends toward the bottom wall 88 and is directed into the optical component 164. Once the first cable 270 is split, second cables 272 extend from the optical component 164 and are looped all the way around first radius limiter 160 before heading toward the crimp holders 198. From the crimp holders 198, cables 274 crimped to the other ends of the crimps 200 exit the module 14 through the module exit structure 78.

Related fiber optic splitter modules are described in commonly-owned U.S. Pat. Nos. 7,376,322; 7,400,813; 7,376,323; and 7,346,254, the entire disclosures of which are incorporated herein by reference.

FIGS. 57-64 illustrate one of the adapters 16 having examples of inventive aspects in accordance with the disclosure. The adapters 16 form connection locations between the connectors 18 terminated to an incoming fiber optic cable and the connectors 20 of the splitter modules 14 mounted within the chassis 12 (e.g., when the splitter modules are configured as rear-input modules).

Referring to FIGS. 57-64, each adapter 16 includes a main body 290 with a front end 292, a rear end 294, and a longitudinal opening 296 extending therebetween. The connector 20 of a fiber optic splitter module 14 is inserted into the opening 296 of the adapter 16 through the front end 292 and a connector 18 terminated to an incoming fiber optic cable is inserted into the opening 296 of the adapter 16 through the rear end 294 for making a connection therewith. As shown in an exploded view of the adapter 16 in FIG. 57, the internal elements of the adapter are inserted through a side opening 298 into the interior 300 of the adapter main body 290. The elements for each adapter 16 include a ferrule alignment sleeve 302 and a pair of inner housing halves 304. These elements are placed within the interior 300 of the main body 290 in a manner similar to that shown in commonly-owned U.S. Pat. No. 5,317,663, the disclosure of which is incorporated herein by reference. A panel 305 closes the side opening 298 and secures the internal elements within each adapter 16. The adapters 16 shown herein are for SC style connectors, although other types, styles and formats of adapters may be used within the scope of the present disclosure and also connectors to mate with these alternative adapters.

Still referring to FIGS. 57-64, the main body 290 of the adapter 16 includes a top wall 306 and a bottom wall 308. The top wall 306 of the adapter main body 290 includes a top longitudinal guide 310 and the bottom wall 308 of the adapter main body 290 includes a bottom longitudinal guide 312. The top and bottom longitudinal guides 310, 312 are configured to slide within top and bottom guide slots 314, 316, respectively, defined within adapter mounts 58 of the upper mounting guides 48 of the chassis 12. As shown in FIGS. 72-74, the top longitudinal guide 310 defines a catch 318 that is configured to fit within a slot 320 located on a top wall 322 of the adapter mount 58 of the upper mounting guide 48. The catch 318 includes a ramped front face 324 and a square rear face 326. The catch 318 provides a snap-fit interlock for the adapter 16 within the adapter mount 58. As will be described in further detail below, the adapter mount 58 of the upper mounting guide 48 defines a flexible cantilever arm 328 that flexes upwardly to receive the catch 318. The adapter main body 290 also defines a handle 330 at a rear end of the top longitudinal guide 310. The handle 330 is used for slidably pulling/pushing the adapter 16 from/into the adapter mount 58. Please refer to FIGS. 72-74 for an illustration of the insertion of the adapter 16 into the adapter mount 58.

FIGS. 65-71 illustrate the upper mounting guide 48 that is configured to be mounted into the chassis 12 and guide a fiber optic splitter module 14 into the chassis 12. As discussed previously, the upper mounting guide 48 cooperates with a lower mounting guide 50 in guiding the fiber optic splitter modules 14 into the chassis 12. As discussed above, each upper mounting guide 48 also includes an adapter mount 58 adjacent the rear end thereof for guiding adapters 16 into the chassis 12 from the rear end.

Figure 2:
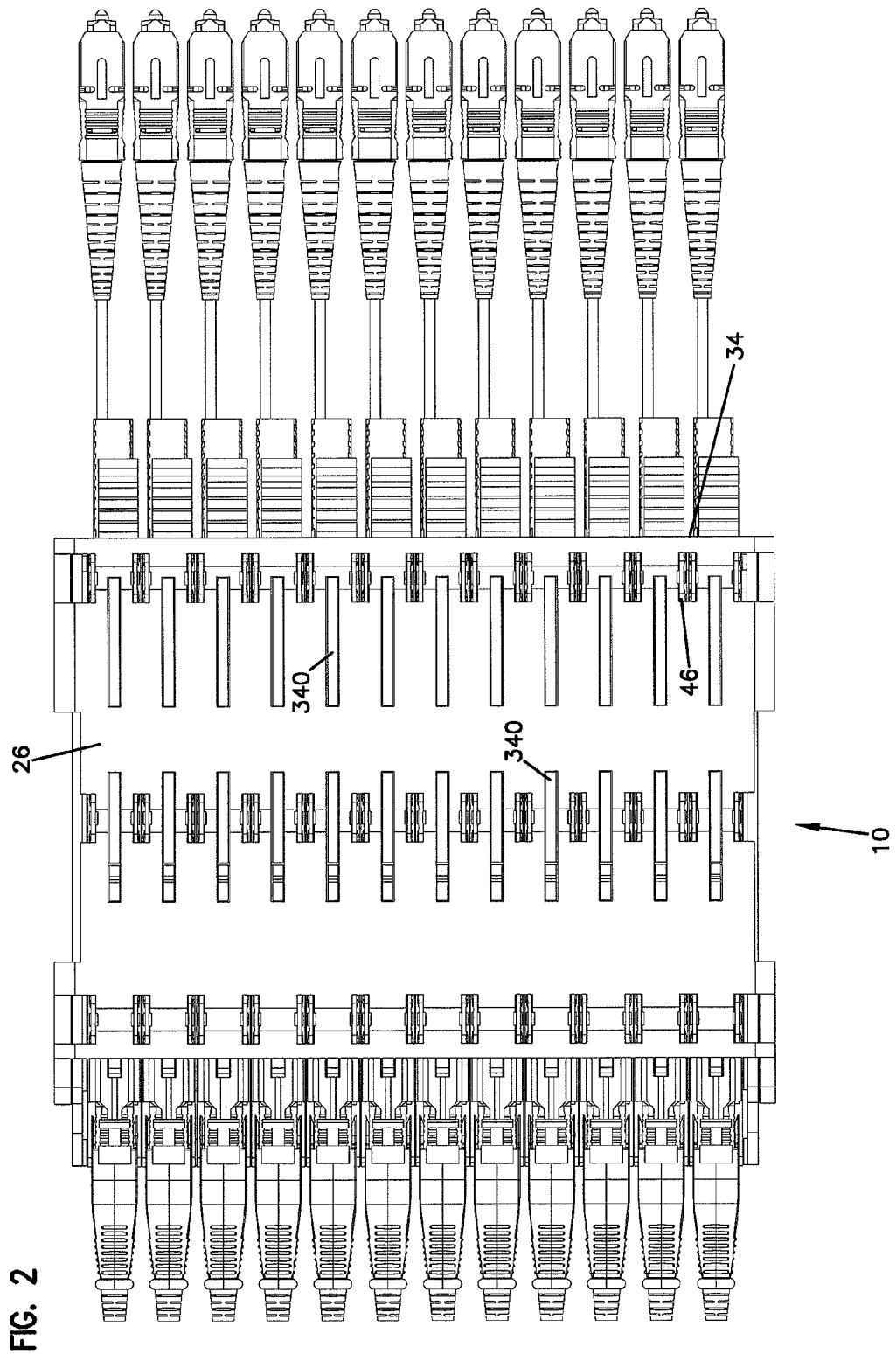
FIG. 2 is a top view of the telecommunications assembly of FIG. 1.
Figure 7:
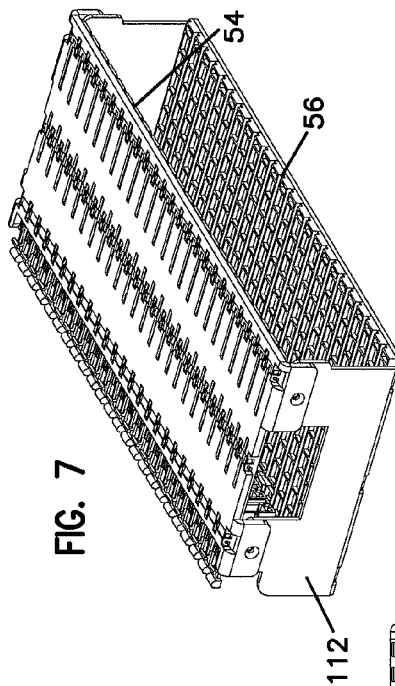
FIG. 7 is a front perspective view of a second embodiment of a chassis configured to house a plurality of the fiber optic splitter modules shown in FIG. 1, the chassis shown with a plurality of adapters mounted therein.
Figure 11:
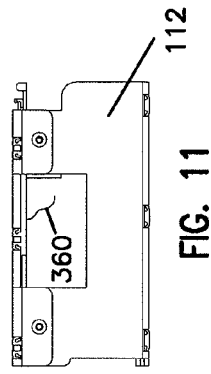
FIG. 11 is a right side view of the chassis of FIG. 7.
Figure 10:
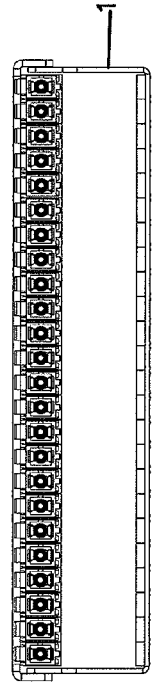
FIG. 10 is a rear view of the chassis of FIG. 7.
Figure 8:
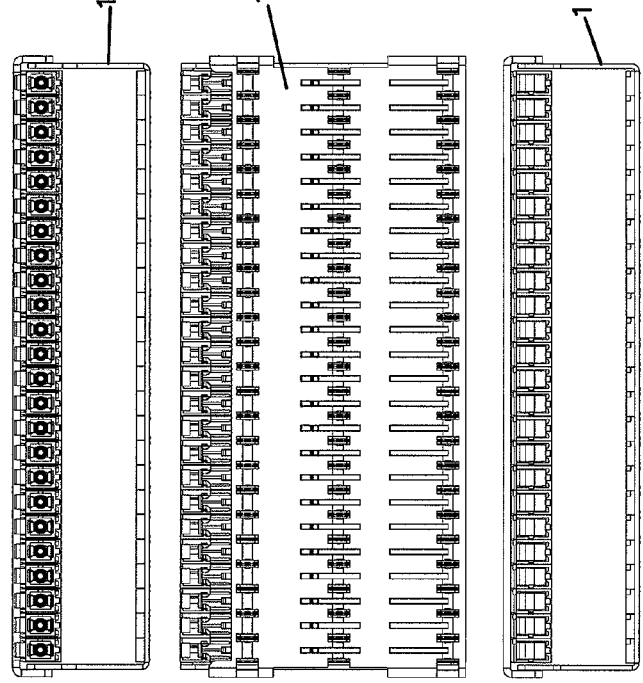
FIG. 8 is a top view of the chassis of FIG. 7.
Figure 9:
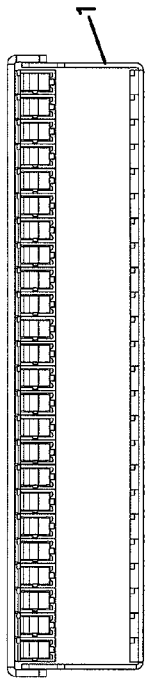
FIG. 9 is a front view of the chassis of FIG. 7.
Figure 12:
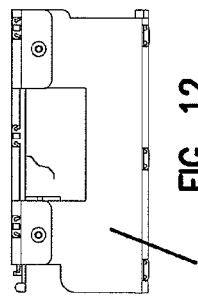
FIG. 12 is a left side view of the chassis of FIG. 7.

Referring to FIGS. 65-71, the upper mounting guide 48 defines an elongate body 332 configured to extend from the front end 36 to the rear end 40 of the chassis 12. The upper mounting guide 48 includes flexible snap-fit structures 334 with ramped tab portions 336 for snap-fitting the upper mounting guide 48 into slots 46 defined on the top wall 26 of the chassis 12. As shown in FIGS. 1 and 2, for example, the ramped tabs 336, after passing through the slots 46, lock the upper mounting guide 48 to the top wall 26 of the chassis 12. As shown in FIGS. 1 and 2, when two adjacently placed upper mounting guides 48 are locked to the top wall 26, the right set of snap-fit structures 334 of one mounting guide 48 are positioned next to the left set of snap-fit structures 334 of an adjacent guide 48.

The elongate body 332 of the upper mounting guide 48 also includes elongate keys 338 that are configured to fit within elongate slots 340 defined in the top wall 26 of the chassis 12.

As discussed previously, the upper mounting guide 48 defines the adapter mount 58 at the rear of the body 332. The adapter mount 58 defines an opening 342 for slidably receiving an adapter 16. The adapter mount 58 includes top and bottom guide slots 314, 316 for slidably receiving the top and bottom longitudinal guides 310, 312 of the adapter main body 290 as discussed above. Also as discussed above, adjacent the rear of the body 332 of the upper mounting guide 48 is a cantilever arm 328 of the adapter mount 58. The cantilever arm 328 is configured to flex upwardly to receive the catch 318 of the adapter 16 for locking the adapter 16 into the adapter mount 58. The adapter mount 58 defines a slot 320 that is configured to receive the catch 318 of the adapter 16. The cantilever arm 328 includes a handle 350 for pulling up on the arm 328 to release the adapter 16 from the adapter mount 58.

Still referring to FIGS. 65-71, the upper mounting guide 48 defines a longitudinal cutout 352 extending from the front end thereof. As discussed above, when two upper mounting guides 48 are placed adjacent to each other, the cutout 352 forms a longitudinal slot 54 for slidably receiving the upper flange 64 of the fiber optic splitter module 14 when the modules 14 are inserted into the chassis 12. The slots 54 also include stops 62 to prevent further advancement of the splitter modules 14 within the chassis 12 (see FIGS. 65, 66, and 69).

Adjacent the front end 157 of the upper mounting 48 guide is a slot 155. The slot 155 is for receiving the latching tab 150 of the flexible latch 140 of the main housing 74 of the splitter module 14. As discussed previously, the latching tab 150 includes a ramped face 152 that causes the flexible latch 140 to elastically deflect downwardly when module 14 is being inserted into chassis 12. The latching tab 150 also includes a square face 154 that is configured to act as a stop within the slot 155 for keeping the module 14 snap-fit within the chassis 12. As shown in the cross-sectional view in FIG. 96, the latching tab 150 and the slot 155 provide spacing for some horizontal float for the splitter module 14 once the module 14 is inserted within the chassis 12.

The removal of the module 14 from the chassis 12 is performed by pressing the latch 140 downwardly to clear the square face 154 of tab 150 from the slot 155 adjacent the front end 157 of the upper mounting guide 48 and sliding module 14 away from the chassis 12.

Referring to FIGS. 72-74, the upper mounting guide 48 also includes a slit 356 and a shield mount 358 for receiving a flexible shield 360. The flexible shield 360 is shown in detail in FIGS. 82-88. According to one embodiment, the shield 360 is made out of a thin, flexible material. The shield 360 is placed on the upper mounting guide 48 by passing it through the slit 356 from the upper side 359 of the mounting guide 48 toward the lower side 361. The upper portion 362 of the shield 360 is placed around the shield mount 358 for securing the shield 360 to the upper mounting guide 48. The shield 360 also includes ramped tabs 364 that abut against the lower side 361 of the mounting guide 48 to lock the shield 360 to the mounting guide 48 once the shield 360 has been slid through the slit 356.

The shield 360 is adapted to provide protection against accidental exposure to light. As shown in FIGS. 72-74, the shield 360 is positioned in front of the adapter 16. Before a splitter module 14 is placed in an associated mounting location 52, if a connectorized cable that is connected to an adapter 18 within the chassis 12 is illuminated and transmitting light signals, shield 360 will prevent accidental exposure to these signals which might damage eyes or other sensitive organs, or nearby communications equipment.

As shown in FIGS. 89-91, 95, and 96, the insertion of the splitter module 14 into the chassis 12 pushes the shield 360 out of the way. The shield 360 is deflected by the module 14 as the module 14 is inserted through the front opening 34 so that the connector 20 of the module 14 can be coupled to the adapter 16 located at the rear end 40 of the chassis 12. As discussed above, the shield 360 is preferably made of a resilient deformable material that will return to the position when module 14 is withdrawn from mounting location 52.

FIGS. 75-81 illustrate one of the lower mounting guides 50 that are configured to be mounted within the chassis 12. The lower mounting guides 50 are configured to cooperate with the upper mounting guides 48 for guiding the splitter modules 14 into the chassis 12.

Referring to FIGS. 75-81, the lower mounting guide 50 includes an elongate body 380 configured to extend from the front end 36 of the chassis 12 to the rear end 40. As in the upper mounting guide 48, the lower mounting guide 50 includes flexible snap-fit structures 334 with ramped tab portions 336 for snap-fitting the lower mounting guide 50 into slots 46 defined on the bottom wall 28 of the chassis 12. The ramped tabs 336, after passing through the slots 46, lock the lower mounting guide 50 to the bottom wall 28 of the chassis 12.

When two adjacently placed lower mounting guides 50 are locked to the bottom wall 28, the right set of snap-fit structures 334 of one mounting guide 50 are positioned next to the left set of snap-fit structures 334 of an adjacent lower mounting guide 50.

Still referring to FIGS. 75-81, the lower mounting guide 50 defines a longitudinal cutout 382 extending from the front end to the rear end thereof. As discussed above, when two lower mounting guides 50 are placed adjacent to each other, the cutout 382 forms a longitudinal slot 56 for slidably receiving the lower flange 66 of the fiber optic splitter module 14 when the module 14 is inserted into the chassis 12. The slots 56 include stops 60 adjacent the rear end 40 of the chassis 12 for preventing further advancement of the splitter modules 14 within the chassis 12 once the connectors 20 of the modules 14 have been coupled to the adapters 16 (see FIGS. 1, 75, 77, and 79).

The insertion of a splitter module 14 into the chassis 12 of the telecommunications assembly 10 is illustrated in FIGS. 89-96. It should be noted that, for ease of illustration and understanding of the interaction between the splitter modules 14 and the upper and lower mounting guides 48, 50, the upper and the lower mounting guides 48, 50 and the splitter module 14 are shown outside of the chassis 12 in FIGS. 89-96.

FIG. 89 illustrates the fiber optic splitter module 14 partially inserted, wherein the fiber optic splitter module 14 is shown in a position prior to the connector 20 of the splitter module 14 having contacted the flexible shield 360 located within the chassis 12. FIG. 90 illustrates the fiber optic splitter module 14 in a position with the connector 20 of the fiber optic splitter module 14 making initial contact with the flexible shield 360 located within the chassis 12. FIGS. 91-94 illustrate the fiber optic splitter module 14 in a fully inserted position within the chassis 12.

FIG. 95 is a side cross-sectional view of the fiber optic splitter module 14 within the chassis 12, taken through the center of the fiber optic splitter module 14, wherein the splitter module 14 is in a position within the chassis 12 with the connector 20 of the fiber optic splitter module 14 making initial contact with the flexible shield 360 located within the chassis 12. FIG. 96 is a side cross-sectional view of the fiber optic splitter module 14 within the chassis 12, taken through the center of the fiber optic splitter module 14, wherein the splitter module 14 is in a fully inserted position within the chassis 12.

Referring back to FIG. 89, insertion of fiber optic module 14 into the front opening 34 of chassis 12 begins the mating of module 14 to chassis 12 and to the adapter 16. Top flanges 64 engage top slots 54 and bottom flanges 66 engage bottom slots 56 of chassis 12 as module 14 is inserted. Further insertion of the module 14 causes the connector 20 of the fiber optic splitter module 14 to make initial contact with the shield 360 of the chassis 12 to move the shield 360 out of the way (a side cross-sectional view is shown in FIG. 95). In FIGS. 91-94, fiber optic splitter module 14 is shown in a fully inserted position within chassis 12, having moved the shield 360 out of the way (a side cross-sectional view is shown in FIG. 96).

The shield 360 is configured such that the shield 360 does not engage the ferrule 400 of the connector 20 of the splitter module 14 when the connector 20 contacts the shield 360 to move it out of the way. Instead, the outer connector housing 19 of the connector 20 pushes the shield 360 out of the way.

As the shield 360 is fully deflected, further insertion of the module 14 brings the connector 20 of the module 14 into contact with the adapter 16 and the connector 20 is received within the front end 292 of the adapter 16. The flexible latch 140 is deflected downwardly as the module 14 is inserted and then flexes back upwardly so that the latching tab 150 of the splitter module main housing 74 is captured within the slot 155 of the upper mounting guide 48 for keeping the module 14 snap-fit within the chassis 12. The module 14 is now in position to process and transmit signals through first cable 270, optical component 164 and second cable 272 within the module interior.

The removal of the module 14 from the chassis 12 is performed by pressing the latch 140 downwardly to clear the square face 154 of the latching tab 150 from the slot 155 adjacent the front end of the upper mounting guide 48 and sliding the module 14 away from the chassis 12.

The above specification, examples and data provide a complete description of the manufacture and use of the inventive aspects of the disclosure. Since many embodiments of the disclosure can be made without departing from the spirit and scope of the inventive aspects of the disclosure, the inventive aspects resides in the claims hereinafter appended.

What is claimed is:

1. A telecommunications module comprising:
a housing including a main housing portion and a removable cover cooperatively defining an interior, the main housing portion defining a first sidewall, a front wall, a rear wall, a first wall, and an opposing second wall, the cover defining a second sidewall of the housing when mounted on the main housing portion to close off the interior, a height of the telecommunications module defined between the first wall and the second wall, the height being between 2 and 3 inches and configured to fit within one standard unit (RU) of rack space in a standard telecommunications rack;

the housing including at least one signal output location defined on the front wall of the main housing portion;

an optical component located within the interior, the optical component configured to receive a fiber optic input signal coming in from a signal input location of the housing and output a fiber optic output signal going toward the signal output location defined on the front wall of the main housing portion, wherein the telecommunications module is configured such that the signal input location can be defined by either an optional signal input location on the front wall or an optional signal input location on the rear wall of the main housing portion;

wherein the optional signal input location on the front wall is defined by a selectively breakable portion of the telecommunications module, wherein the selectively breakable portion of the telecommunications module is defined by a protrusion of the cover that extends from the second sidewall toward the main housing portion, the protrusion received within a recess defined on the front wall, the protrusion being selectively breakable to expose the recess.

2. A telecommunications module according to claim 1, wherein the protrusion includes two breakable portions separated by a break line, the breakable portions including a base portion and a tip portion, wherein, if one input cable carrying a fiber optic input signal is to enter the housing, the tip portion is adapted to be selectively broken off and if two input cables carrying fiber optic input signals are to enter the housing, the protrusion is selectively broken off at the base portion to remove the entire protrusion.

3. A telecommunications module according to claim 1, wherein the optional signal input location on the rear wall is defined by at least one fiber optic connector extending from the rear wall of the main housing portion toward an exterior of the housing.

4. A telecommunications module according to claim 1, wherein the optical component is a fiber optic splitter that splits the fiber optic input signal into a plurality of the fiber optic output signals.

5. A telecommunications module according to claim 1, wherein the housing includes a flexible cantilever arm extending from the front wall of the main housing portion for providing a snap fit connection with a piece of telecommunications equipment.

6. A telecommunications module according to claim 1, wherein the main housing portion includes a cable exit projecting outwardly from the housing, the cable exit defining the at least one signal output location.

7. A telecommunications module according to claim 1, wherein the main housing portion includes a cable management structure in the form of a spool for guiding a cable carrying the fiber optic output signal toward the signal output location.

8. A telecommunications module comprising:
a housing including a main housing portion and a removable cover cooperatively defining an interior, the main housing portion defining a first sidewall, a front wall, a rear wall, a first wall, and an opposing second wall, the cover defining a second sidewall of the housing when mounted on the main housing portion to close off the interior, a height of the telecommunications module defined between the first wall and the second wall, the height being between 2 and 3 inches and configured to fit within one standard unit (RU) of rack space in a standard telecommunications rack;

the housing including at least one signal output location defined on the front wall of the main housing portion;

an optical component located within the interior, the optical component configured to receive a fiber optic input signal coming in from a signal input location of the housing and output a fiber optic output signal going toward the signal output location defined on the front wall of the main housing portion, wherein the telecommunications module is configured such that the signal input location can be defined by either an optional signal input location on the front wall or an optional signal input location on the rear wall of the main housing portion;

a clamp structure located within the interior for removably mounting the optical component to the main housing portion;

wherein the optional signal input location on the front wall of the main housing portion is defined by a selectively breakable portion of the telecommunications module, wherein the selectively breakable portion of the telecommunications module is defined by a protrusion of the cover that extends from the second sidewall toward the main housing portion, the protrusion received within a recess defined on the front wall, the protrusion being selectively breakable to expose the recess.

* * * * *